United States Patent
Daoust et al.

(10) Patent No.: US 11,061,198 B2
(45) Date of Patent: Jul. 13, 2021

(54) REEL ENCLOSURES

(71) Applicant: PPC Broadband, Inc., East Syracuse, NY (US)

(72) Inventors: Daniel Daoust, Syracuse, NY (US); Peter A. Carapella, Fayetteville, NY (US); Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 44 days.

(21) Appl. No.: 16/128,500

(22) Filed: Sep. 11, 2018

(65) Prior Publication Data
US 2019/0079257 A1    Mar. 14, 2019

Related U.S. Application Data

(60) Provisional application No. 62/557,139, filed on Sep. 11, 2017, provisional application No. 62/584,647, filed on Nov. 10, 2017, provisional application No. 62/613,047, filed on Jan. 2, 2018.

(51) Int. Cl.
| | |
|---|---|
| *G02B 6/44* | (2006.01) |
| *B65H 49/32* | (2006.01) |
| *B65H 75/44* | (2006.01) |
| *H02G 11/02* | (2006.01) |

(52) U.S. Cl.
CPC ......... *G02B 6/4457* (2013.01); *B65H 49/322* (2013.01); *B65H 49/325* (2013.01); *B65H 75/4471* (2013.01); *B65H 2701/32* (2013.01); *H02G 11/02* (2013.01)

(58) Field of Classification Search
CPC ............... B65H 49/322; B65H 49/325; B65H 75/4471; B65H 2701/32; G02B 6/4457; H02G 11/02
See application file for complete search history.

(56) References Cited

U.S. PATENT DOCUMENTS

| | | | |
|---|---|---|---|
| 4,011,940 | A | 3/1977 | Neal et al. |
| 4,026,615 | A | 5/1977 | Tazaki et al. |
| 4,078,657 | A | 3/1978 | Schurman |
| 4,230,225 | A | 10/1980 | Okada et al. |

(Continued)

FOREIGN PATENT DOCUMENTS

WO    WO-2016115469 A1 *    7/2016    ........... G02B 6/4457

OTHER PUBLICATIONS

International Search Report and Written Opinion in International Application No. PCT/US18/50536.
(Continued)

*Primary Examiner* — William E Dondero
(74) *Attorney, Agent, or Firm* — MH2 Technology Law Group LLP

(57) ABSTRACT

A reel enclosure includes a base and a door pivotally coupled with the base. The door is movable between a first closed position and a second open position and is configured to hold a reel at an interior surface of the door. The reel is configured to have cable wound thereon. In the first closed position, the base is configured to prevent the reel from rotating relative to the door and the base, and, in the second open position, the door is configured to hold the reel outside of an interior of the base and permit the reel to rotate relative to the door and the base.

15 Claims, 28 Drawing Sheets

(56) References Cited

U.S. PATENT DOCUMENTS

| | | |
|---|---|---|
| 4,469,225 A | 9/1984 | Takahashi |
| 4,846,343 A | 7/1989 | Rupert |
| 4,871,064 A | 10/1989 | Hehn et al. |
| 5,860,523 A | 1/1999 | Konno et al. |

OTHER PUBLICATIONS

International Preliminary Report on Patentability dated Mar. 17, 2020 in corresponding International Application No. PCT/US2018/050536, 7 pages.

* cited by examiner

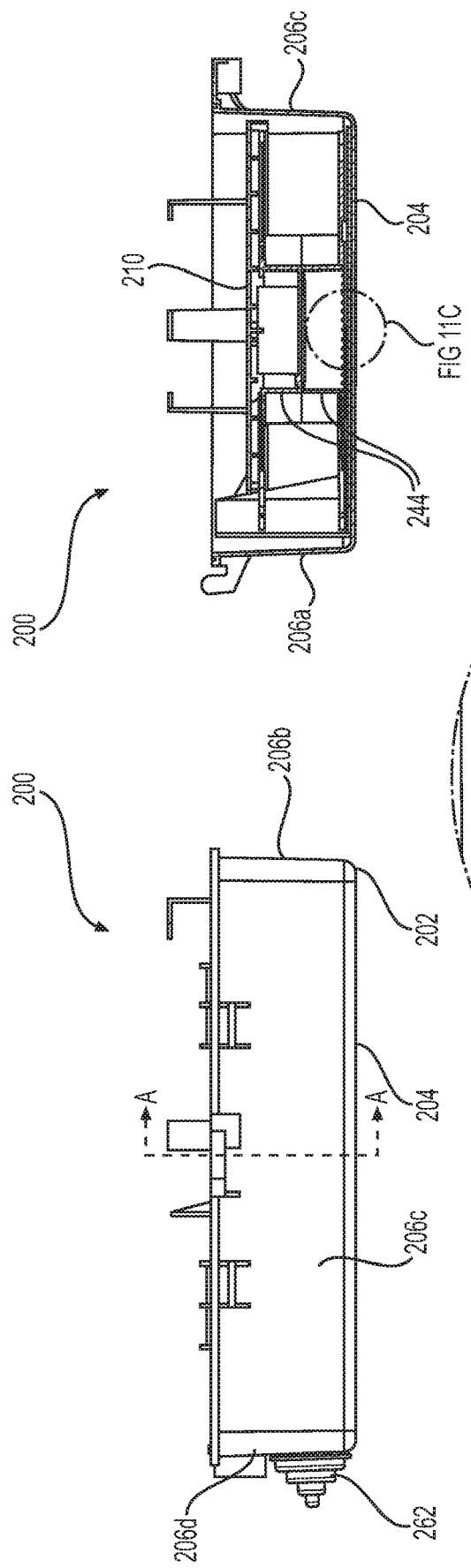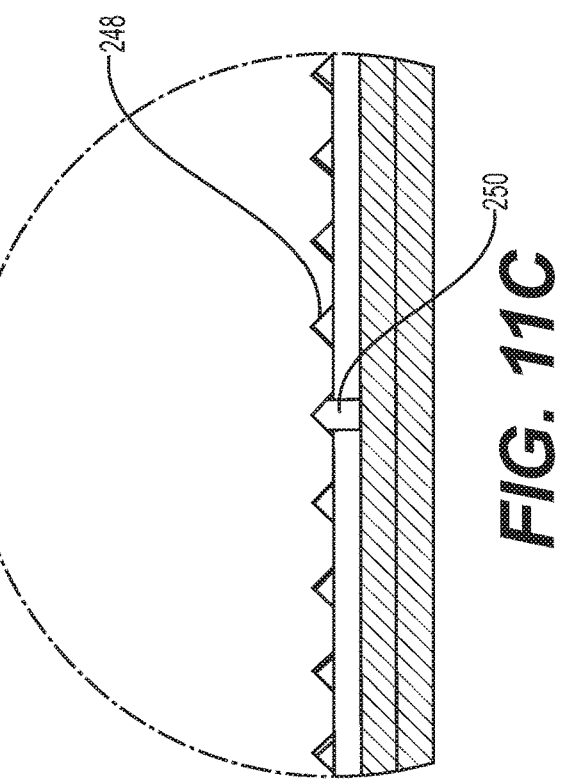

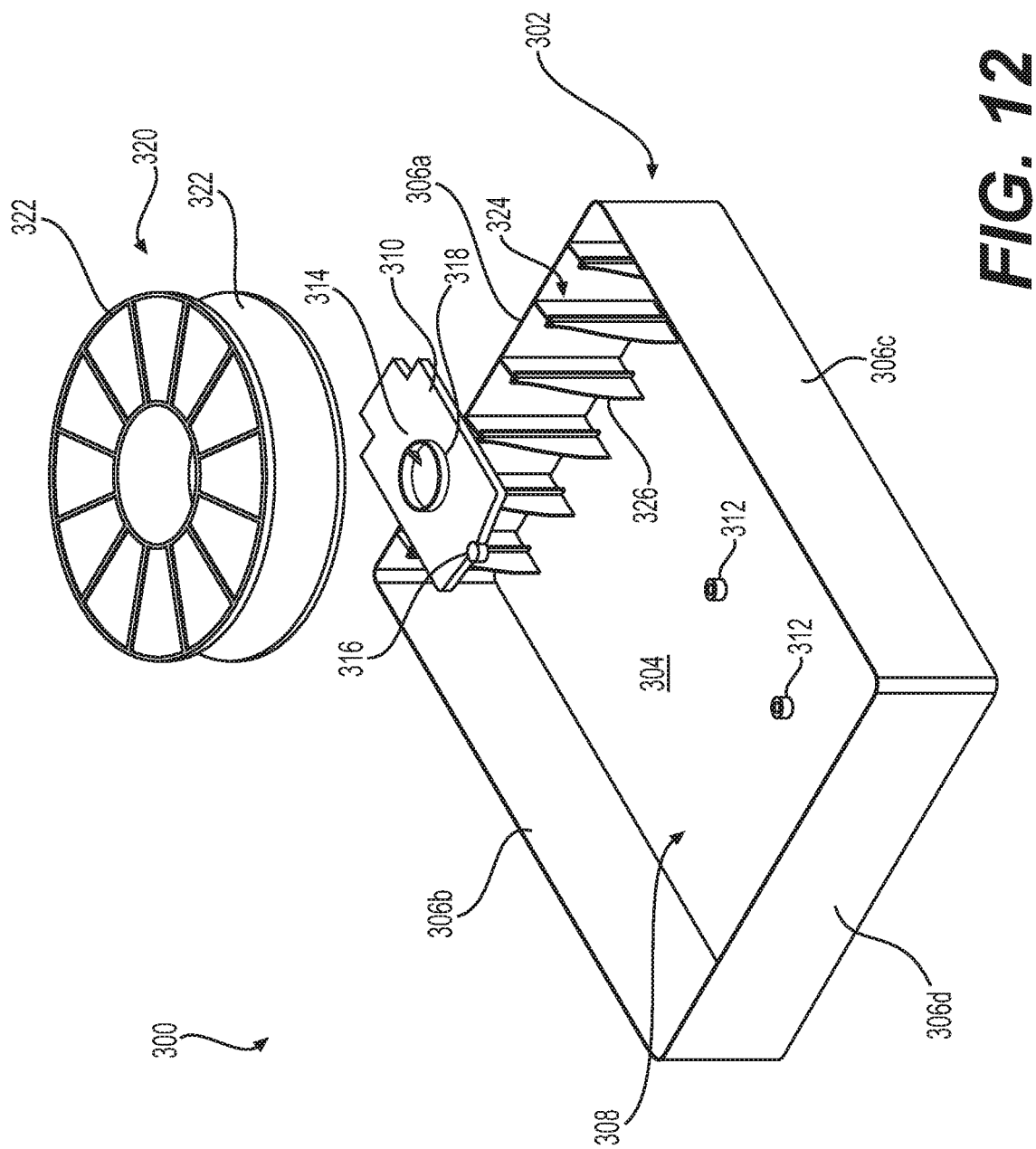

REEL ENCLOSURES

CROSS-REFERENCE TO RELATED APPLICATIONS

This nonprovisional application claims the benefit of U.S. Provisional Application No. 62/557,139, filed Sep. 11, 2017, U.S. Provisional Application No. 62/584,647, filed Nov. 10, 2017, and U.S. Provisional Application No. 62/613,047, filed Jan. 2, 2018, the contents of all of which are incorporated herein by reference.

TECHNICAL FIELD

The disclosure relates generally to cable and, in particular, to a reel enclosure for storing and dispensing cable such as, for example, fiber optic cable. The disclosure further relates to a method for storing and dispensing such cable.

BACKGROUND

As demand for telecommunications increases, fiber optic networks are being extended in more and more areas. Conventionally, fiber optic enclosures are used to provide a subscriber access point to the fiber optic network. Such a fiber optic enclosures is connected to the fiber optic network through a subscriber cable connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

Conventional fiber optic enclosures include a spool of fiber optic cable provided on an exterior of the enclosure or provided in the interior of the enclosure. When installing fiber optics from enclosure to enclosure, paying out cable from a spool depending on practice can present a variety of issues. If a spool is recessed within the interior of the enclosure, access to the spool becomes limited. On the other hand, if the spool is provided on the exterior of the enclosure, additional equipment or personnel may be required. Also, paying out fiber optic cable and storing slack can require the unwinding and then rewinding of cable, thereby creating waste. This process typically requires the use of outside tooling or extra man power.

It may be desirable to provide a fiber enclosure that can hold the spool in a first position giving maximum accessibility for payout and in a second position for secure storage of the spool.

SUMMARY

According to various aspects of the disclosure, a reel enclosure includes a base and a door pivotally coupled with the base. The door is movable between a first closed position and a second open position and is configured to hold a reel at an interior surface of the door. The reel is configured to have cable wound thereon. In the first closed position, the base is configured to prevent the reel from rotating relative to the door and the base, and, in the second open position, the door is configured to hold the reel outside of an interior of the base and permit the reel to rotate relative to the door and the base.

In accordance with some embodiments of the disclosure, a reel enclosure includes a base and a panel pivotally coupled with the base. The panel is movable relative to the base between a first closed position and a second open position, and the panel is configured to hold a reel at an interior surface of the panel, the reel being configured to have cable wound thereon. In the first closed position, the base is configured to prevent the reel from rotating relative to the panel and the base, and the panel is configured to block access to the reel. In the second open position, the panel is configured to hold the reel outside of an interior of the base and permit the reel to rotate relative to the panel and the base. A back panel is mounted to the base and configured to accommodate optical fiber connections, and the interior surface of the panel includes a raised support configured to receive the reel such that the reel is spaced from the interior surface of the panel. At least one raise support structure on the interior surface of the panel is configured to cooperate with a hub of the reel to prevent rotation of the hub relative to the panel in both the first and second positions of the panel. Reel flanges of the reel are configured to be coupled with the hub such that the reel flanges are rotatable relative to the hub, the panel, and the base in order to permit payout of cable from the reel. The back panel includes a raised rib and the reel flanges include a plurality of teeth that are disposed about an inner periphery of the reel flanges and extend outward perpendicular to an outer face of one of the reel flanges. In the first closed position of the panel, the teeth of one of the reel flanges adjacent the back panel are configured to engage the raised rib to prevent rotation of the reel flanges relative to the panel and the base.

According to some aspects, the panel is coupled to the base by a hinge connection, the hinge connection including a hinge receiver on a side wall of the base and a hinge member on the panel, and the hinge receiver is configured to receive the hinge member.

In various aspects, the hinge receiver has an upper end with an opening configured to receive a pin of the hinge member, and the upper end of the hinge receiver includes a notched portion facing a direction opposite to a back wall of the base and toward an open side of the base. The hinge member includes a flange extending from a front surface of the panel, the pin extends from the flange in a direction parallel to the panel, and the flange extends from the front surface of the mounting panel at a predetermined angle. In the first closed position, a bottom surface of the flange rests on the upper end of the hinge receiver, and in the second position, the panel is pivoted to a position where the bottom surface of the flange is aligned with the notch in the upper end of the hinge receiver, and the notch is configured to accommodate the flange such that the flange moves downward relative to the hinge receiver and into the notch.

According to various aspects, the flange and the notch are configured such that when the flange is received in the notch, the panel is held in a fixed position. In some aspects, the back panel is a back wall of the base.

In accordance with various embodiments of the disclosure, a reel enclosure includes a base and a panel pivotally coupled with the base by a hinge connection. The panel is movable relative to the base between a first closed position and a second open position, and the panel is configured to hold a reel at an interior surface of the panel, the reel being configured to have cable wound thereon. In the first closed position, the base is configured to prevent the reel from rotating relative to the panel and the base, and the panel is configured to block access to the reel. In the second open position, the panel is configured to hold the reel outside of an interior of the base and permit the reel to rotate relative to the panel and the base. The hinge connection includes a hinge receiver on a side wall of the base and a hinge member on the panel, the hinge receiver is configured to receive the hinge member, and the hinge member is configured to be removed from the hinge receiver by lifting the panel. The hinge receiver has an upper end with an opening configured to receive a pin of the hinge member, and the upper end of the hinge receiver includes a notched portion facing a direction opposite to a back wall of the base and toward an open side of the base. The hinge member includes a flange extending from a front surface of the panel, the pin extends from the flange in a direction parallel to the panel, and the flange extends from the front surface of the mounting panel at a predetermined angle. In the first closed position, a bottom surface of the flange rests on the upper end of the hinge receiver, and, in the second position, the panel is pivoted to a position where the bottom surface of the flange is aligned with the notch in the upper end of the hinge receiver, and the notch is configured to accommodate the flange such that the flange moves downward relative to the hinge receiver and into the notch.

In various aspects, the flange and the notch are configured such that when the flange is received in the notch, the panel is held in a fixed position.

According to some aspects, the interior surface of the panel includes a raised support configured to receive the reel such that the reel is spaced from the interior surface of the panel, at least one raise support structure on the interior surface of the panel is configured to cooperate with a hub of the reel to prevent rotation of the hub relative to the panel in both the first and second positions of the panel, and reel flanges of the reel are configured to be coupled with the hub such that the reel flanges are rotatable relative to the hub, the panel, and the base in order to permit payout of cable from the reel.

In some aspects, a back panel is mounted to the base and configured to accommodate optical fiber connections, the back wall includes a raised rib and the reel flanges include a plurality of teeth that are disposed about an inner periphery of the reel flanges and extend outward perpendicular to an outer face of one of the reel flanges, and, in the first closed position of the panel, the teeth of one of the reel flanges adjacent the back wall are configured to engage the raised rib to prevent rotation of the reel flanges relative to the panel and the base. In various aspects, the back panel is the back wall of the base.

According to some embodiments of the disclosure, a reel enclosure includes a base and a panel pivotally coupled to the base and movable between a first closed position and a second open position. The panel is configured to hold a reel at an interior surface of the panel, and the reel is configured to have cable wound thereon. In the first closed position, the base is configured to prevent the reel from rotating relative to the panel and the base, and, in the second open position, the panel is configured to hold the reel and permit the reel to rotate relative to the panel and the base.

In some aspects, the panel is coupled to the base by a hinge connection, and the hinge connection includes a hinge receiver on a side wall of the base and a hinge member on the panel, the hinge receiver being configured to receive the hinge member.

According to various aspects, the hinge receiver has an upper end with an opening configured to receive a pin of the hinge member, the upper end of the hinge receiver includes a notched portion facing a direction opposite to a back wall of the base and toward an open side of the base, the hinge member includes a flange extending from a front surface of the panel, the pin extends from the flange in a direction parallel to the panel, and the flange extends from the front surface of the mounting panel at a predetermined angle. In the first closed position, a bottom surface of the flange rests on the upper end of the hinge receiver. In the second position, the panel is pivoted to a position where the bottom surface of the flange is aligned with the notch in the upper end of the hinge receiver, and the notch is configured to accommodate the flange such that the flange moves downward relative to the hinge receiver and into the notch.

In some aspects, the flange and the notch are configured such that when the flange is received in the notch, the panel is held in a fixed position.

According to some aspects, the interior surface of the panel includes a raised support configured to receive the reel such that the reel is spaced from the interior surface of the panel.

According to various aspects, at least one raise support structure on the interior surface of the panel is configured to cooperate with a hub of the reel to prevent rotation of the hub relative to the panel in both the first and second positions of the panel.

In various aspects, reel flanges of the reel are configured to be coupled with the hub such that the reel flanges are rotatable relative to the hub, the panel, and the base in order to permit payout of cable from the reel.

In some aspects, a back panel is mounted to the base and configured to accommodate optical fiber connections, and the back wall includes a raised rib and the reel flanges include a plurality of teeth that are disposed about an inner periphery of the reel flanges and extend outward perpendicular to an outer face of one of the reel flanges.

According to various aspects, in the first closed position of the panel, the teeth of one of the reel flanges adjacent the back wall are configured to engage the raised rib to prevent rotation of the reel flanges relative to the panel and the base.

In various aspects, the back panel is the back wall of the base.

BRIEF DESCRIPTION OF THE DRAWINGS

FIGS. 11A, 11B, and 11C are side, cross-sectional, and magnified views of the reel enclosure of FIG. 5.

FIG. 12 is an exploded perspective view of a first embodiment of an exemplary fiber optic deployment kit according to various aspects of the disclosure.

DETAILED DESCRIPTION OF EMBODIMENTS

Figure 1:
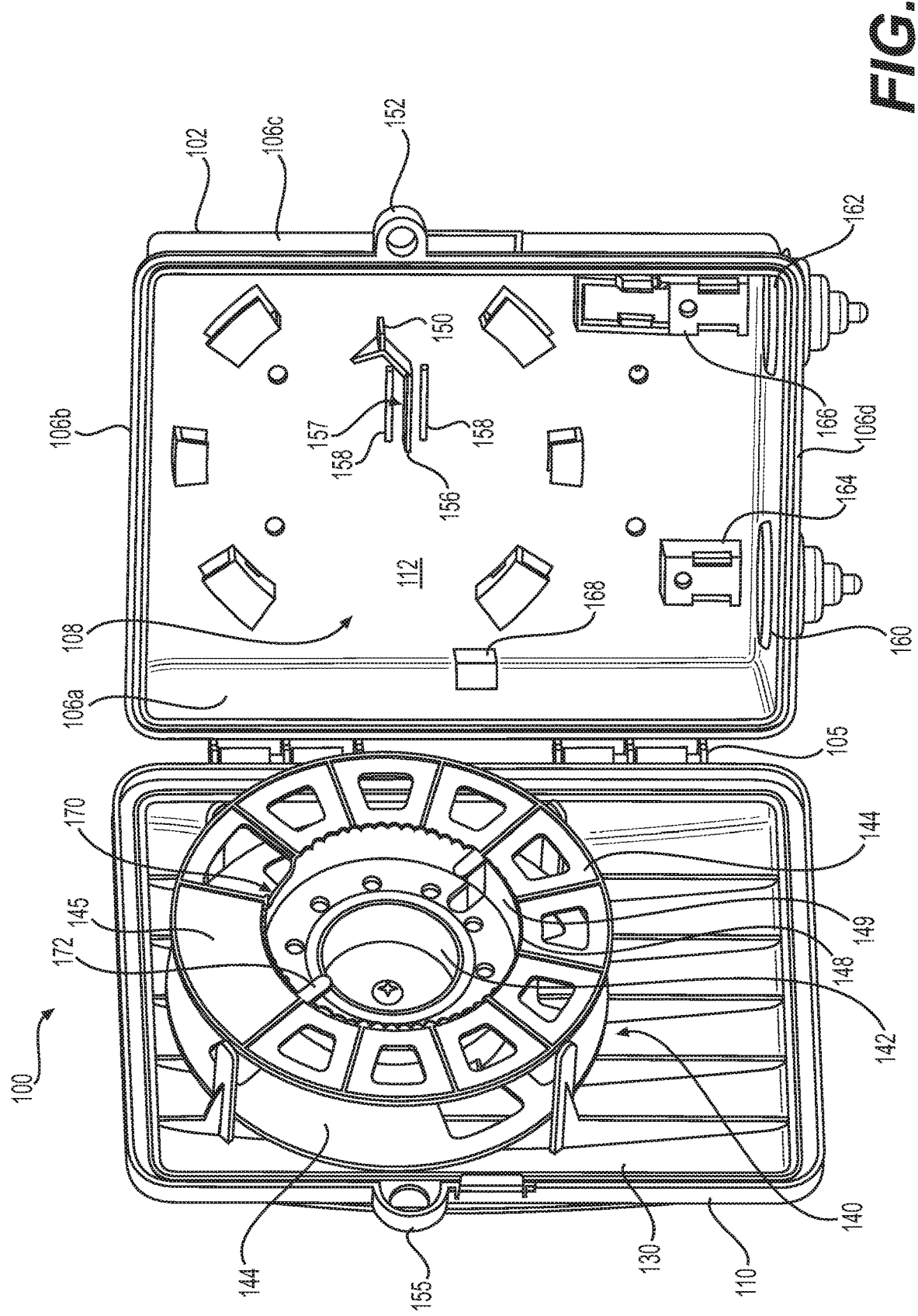
FIG. 1 is a perspective view of an exemplary reel enclosure with a reel in a first position according to various aspects of the disclosure.

Referring to FIGS. 1-4, an exemplary reel enclosure, for example, for storing a reel of fiber optic cable and paying out the fiber optic cable, is illustrated. The reel enclosure 100 includes a base 102 having a back wall 104 (FIG. 2) and four side walls 106a-106d. The back wall 104 and the four side walls 106a-d define an interior 108, which can be closed by a door or panel 110. The reel enclosure 100 may include a back panel 112 removably received by the interior 108 of the base 102.

The door 110 can be pivotally coupled with the base 102, for example, via at least one hinge 105 such that the door 110 is configured to pivot relative to the base 102 between a first closed position (not shown) and a second open position as shown in FIG. 1. Of course, any conventional means for coupling the door 110 with the base 102 such that the door 110 is movable between closed and open positions is contemplated by this disclosure. As would be understood by persons having ordinary skill in the art, in the first closed position, the door 110 blocks access to a reel of cable that is mounted within the reel enclosure 100. In the second open position, as shown in FIG. 1, the door 110 is configured to allow access to a reel of cable that is mounted to an interior surface 130 of the door 110 and to hold the reel outside of the interior 108 of the base 102 and outside of an interior cavity 136 of the door 110 in order to allow a user access to the reel and to facilitate payout of cable from the reel.

For example, in order to facilitate payout of cable from a reel 140 that is mounted to an interior surface 130 of the door 110, the door 110 may form an angle of between 90° and 160° relative to the base 102 in the second open position. In some embodiments, the door 110 may form an angle of 120° relative to the base 102 in the second open position. Of course, the door 110 can be disposed at any desired angle relative to the base 102 in the second open position.

Figure 3:
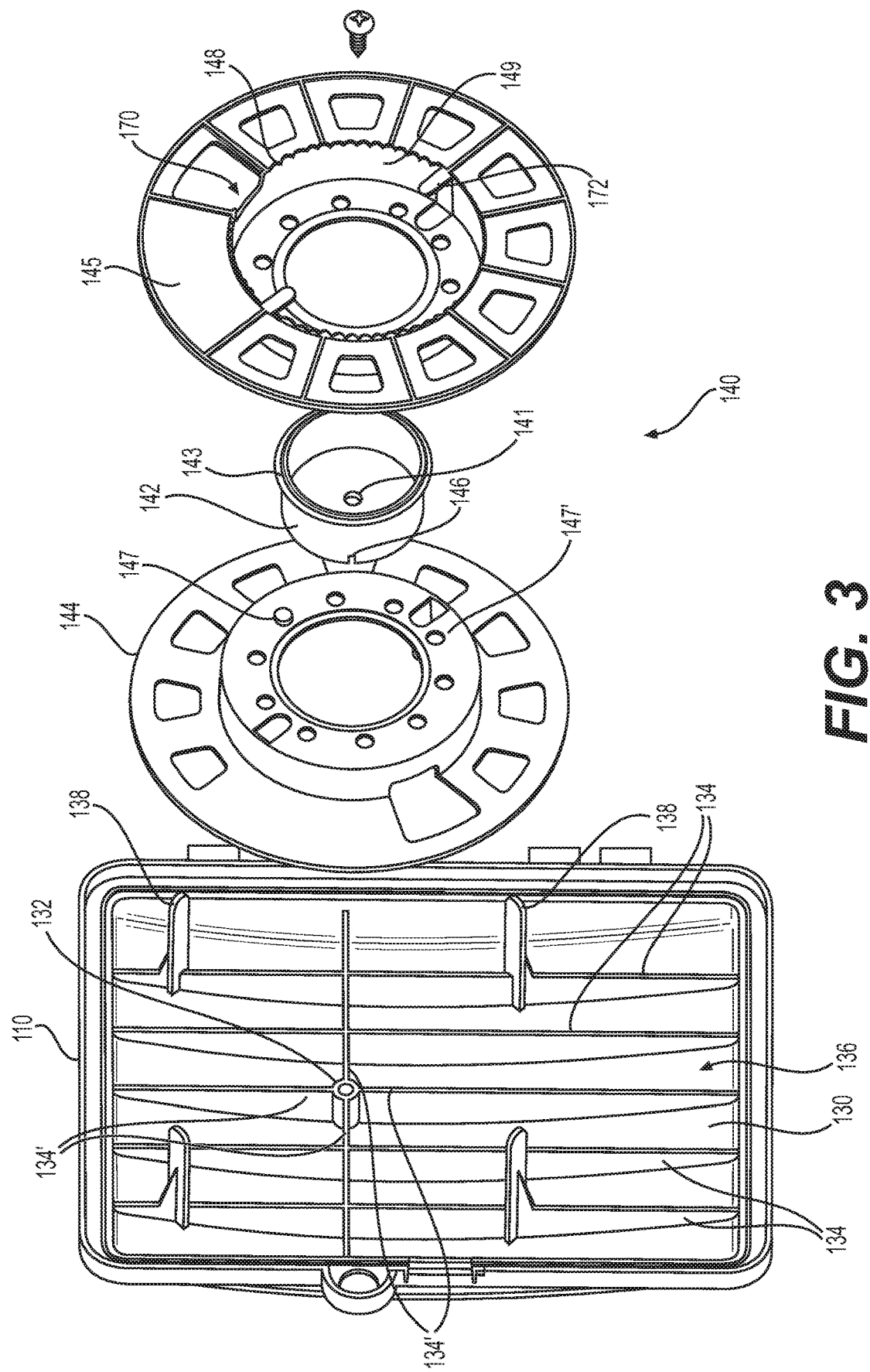
FIG. 3 is an exploded perspective view of the door and reel of the reel enclosure of FIG. 1.

Referring now to FIG. 3, a reel 140 includes a hub 142 and a pair of reel flanges 144. The reel flanges 144 may be identical structures that are oriented in opposite directions relative to one another and connected to one another with a bearing rim 143 of the hub 142 there between. For example, the reel flanges 144 may be secured to one another via press fit, interference fit, or another conventional connection, such as a projection 147 and complementary hole 147'. The reel 140 may be secured to an interior surface 130 of the door 110 by a screw (not shown) that can be inserted through a center opening 141 in the hub 142 and screwed into a boss 132 extending from the interior surface 130 of the door 110.

The interior surface 130 of the door 110 may include one or more raised support structures 134, 134' configured to provide a support for receiving the reel 140 that is spaced from the interior surface 130 of the door 110 so that the reel 140 is held by the door 110 at a position that is outside of an interior cavity 136 of the door 110. One or more of the support structures 134' proximal to the boss 132 may be configured to cooperate with one or more reliefs 146 cut into the hub 142 to prevent rotation of the hub 142 relative to the door 110 in both the first and second positions of the door 110. The hub 142 is coupled with the reel flanges 144 such that the reel flanges 144 are rotatable relative to the hub 142 about the bearing rim 143. Thus, in the open position of the door 110 shown in FIG. 1, the reel flanges 144 are rotatable relative to the door 110 and the base 102 to permit payout of cable from the reel 140.

The door 110 may include one or more retention members 138 extending from the interior surface 130 of the door. The retention members 138 may be sized and arranged relative to the reel 140 so as to prevent cable wound on the reel 140 from unwinding beyond the outer circumference of the reel flanges 144. The retention members 138 thereby retain cable wound on the reel 140 within the outer circumference of the reel flanges 144.

Figure 2:
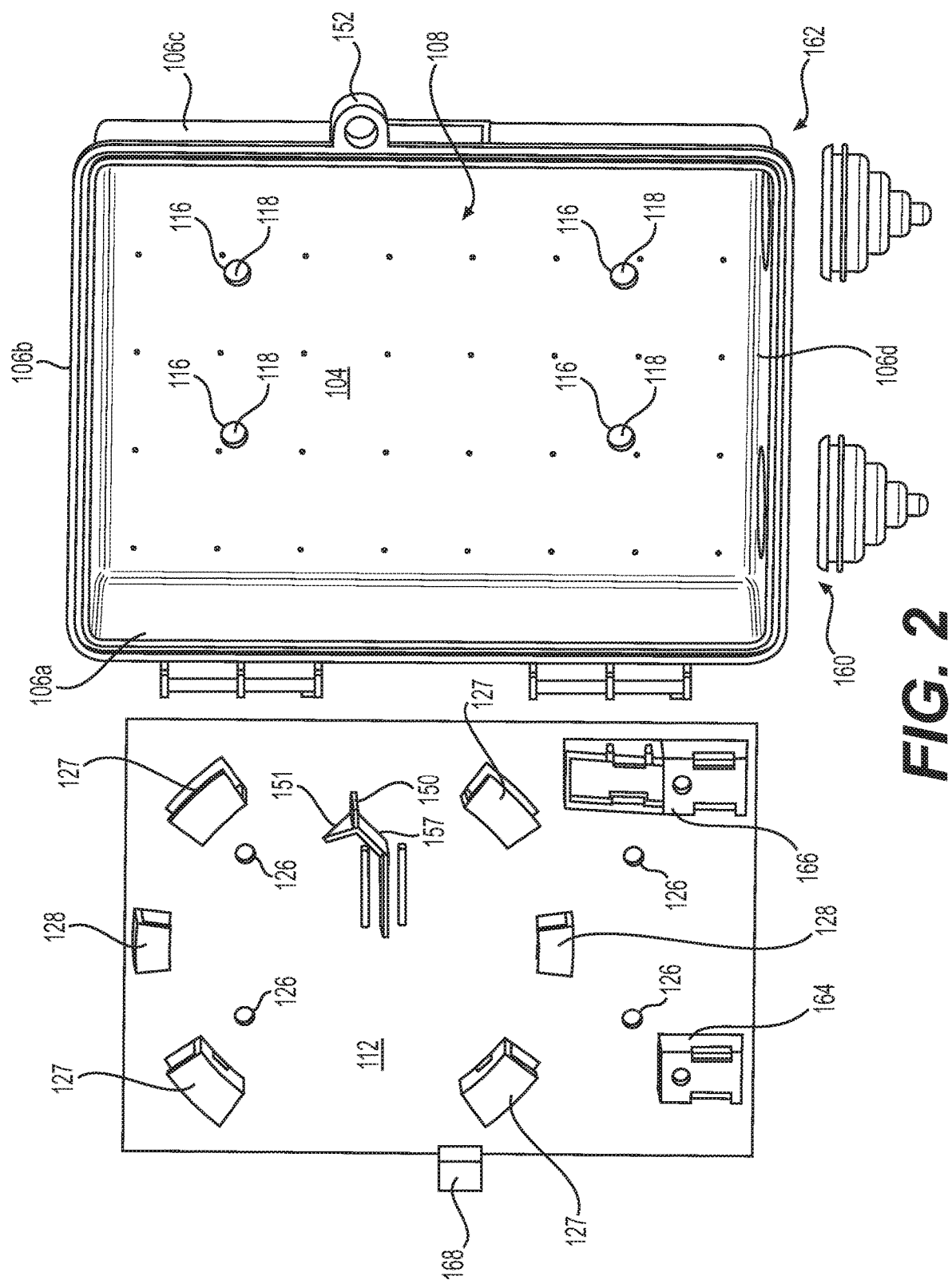
FIG. 2 is an exploded perspective view of the base and back panel of the reel enclosure of FIG. 1

As shown in FIGS. 1 and 2, the back panel 112 of the base 102 includes a raised rib 150, and the reel flanges 144 include a plurality of teeth 148 that are disposed about an inner periphery 149 of the reel flanges 144 and extend outward perpendicular to the outer faces 145 of the reel flanges 144. In the first closed position of the door, the teeth 148 of the reel flange 144 adjacent the back panel 112 engage the raised rib 150 to prevent rotation of the reel flanges 144 relative to the door 110 and the base 102. As shown in FIGS. 1 and 2, the back panel 112 may include one or more additional ribs 151 that reinforce the raised rib 150. The one or more additional ribs 151 are not configured to engage the teeth 148 of the reel flange 144.

The back panel 112 may include first and second wrap guides 127, 128 ("standoffs") that define an arcuate path for receiving slack fiber optic cable. The first wrap guides 127 define an inner perimeter of the arcuate path that is greater than or equal to a minimum bend radius of the fiber optic cable. The second wrap guides 128 define an outer perimeter of the arcuate path and prevent the slack fiber optic cable from become unwound beyond the outer perimeter. The bend radius of the arcuate path of the wrap guides 127 is generally greater than the minimum permissible bend radius of the cable to prevent signal losses. For example, as the bend radius of an optic fiber or filament decreases, the incident light energy is not fully reflected internally of the optic filament. Accordingly, light energy is refracted out of the filament causing a portion of the light energy to be absorbed or lost.

As discussed above, in some aspects, the back panel 112 is received in the interior 108 of the base 102. The base 102 includes counterbores 116 with a guide hole 118, and the back panel 112 include through holes 126 that align with the counterbores 116 when the back panel 112 is received by the base 102. The counterbores 116 and holes 126 are configured to receive a fastener, for example, a screw, for attaching the enclosure 100 to a structure such as a building, house, wall, or the like. The guide hole 118 facilitates placement of the screw, as would be understood by persons of skill in the art.

It should be appreciated that in some aspects, the door 110 may include a latch member 155 configured to cooperate with a latch member 152 on the base 102 in order to secure the door 110 to the base 102 in the first closed position. It should also be appreciated that a wall of the base 102, for example, wall 106d, may include a pair of grommeted openings 160, 162 configured to receive a conduit, for example, a microduct, or a cable or the like from the outside of the reel enclosure 100.

As shown in FIGS. 1 and 2, the back panel 112 may include a structure 156 configured to receive a coupler such as, for example, a coupler for coupling two optical fiber connectors. For example, the structure 156 may include an opening 157 configured to receive the coupler in an up-down direction. Additional ribs 158 may cooperate with the structure 156 to secure the coupler and to raise the coupler from the back panel 112 so that a user can more easily insert and remove a connector to each end of the coupler. In some aspects, the optical fiber connectors may be SC connectors, and the coupler may be an SC coupler.

The back panel 112 may include a first support member 164 substantially aligned with the grommeted opening 160 and a second support member 166 substantially aligned with the grommeted opening 162. The first support member 164 may be configured to receive and/or securely hold, for example, a duct received through the grommeted opening 160 from outside the enclosure 100. Similarly, the second support member 166 may be configured to receive and/or securely hold, for example, a duct or a cable received through the grommeted opening 162 from outside the enclosure 100. In some aspects, the second support member 166 may be configured to receive and/or securely hold strengthening members of a reinforced fiber optic cable received through the grommeted opening 162 from outside the enclosure 100.

Figure 4:
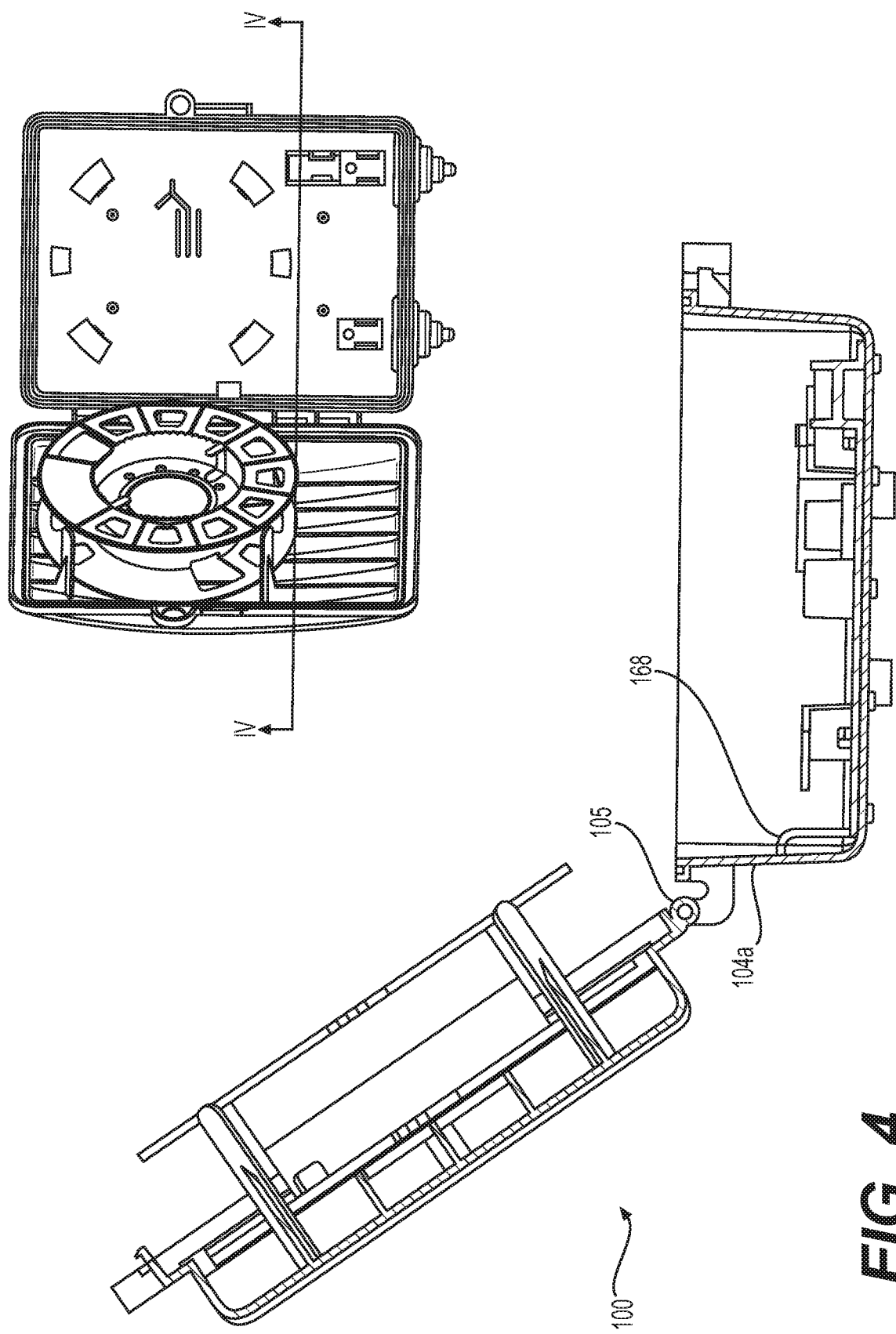
FIG. 4 is a cross-sectional view along line IV-IV of the reel enclosure of FIG. 1.

Referring to FIG. 4, the back panel 112 may include a hook member 168 configured to engage a side wall, for example, wall 106a of the base 102 when the back panel 112 is received by the base 102. The hook member 168 may have a degree of resiliency and may be biased outward from the back panel 112 toward the wall 106a. When the base 102 contains slack cable, loosely arranged cables can be retained by the hook member 168 by pushing the cables between the hook member 168 and the wall 106a, after which the hook member 168 will return to engagement with the wall 106 and retain the cables.

Referring now to FIGS. 1 and 3, an inner periphery 149 of the reel flanges 144 may include a cutout 170 along a portion of its circumference. The reel flanges 144 may include retaining members 172 extending radially inward from the inner periphery 149 of the reel flanges 144. The function of the cutout 170 and retaining members 172 are discussed below.

In use, the reel flanges 144, hub 142, and door 110 are coupled to one another as shown in FIG. 1. As described above, the reel flanges 144 are rotatable together about the bearing rim 143 of the hub 142. The reel 140 is provided with cable, for example, fiber optic cable, wound around the center of the reel flanges 144, as would be understood by persons skilled in the art. A first end of the cable (not shown), for example, a pre-terminated end, may extend from the center of the reel flanges 144 through the cutout 170 and be wrapped within the inner circumference of the exterior space delimited by the reel flanges 144 and retained in the inner circumference by the retaining member 172. The second end of the cable, for example, a pre-terminated end, will be accessible at the outer circumference of the wound cable.

For transport and storage, the door 110 is pivotally coupled with the base 102 of the reel enclosure 100 to the first closed position and, optionally, may be secured and/or locked to the base 102, as would be understood by persons of ordinary skill in the art. In the first closed position, the teeth 148 extending from the outer faces 145 of the reel flanges 144 engage the raised rib 150 extending into the enclosure space from the back panel 112. Although FIG. 1 illustrates a single raised rib 150, it should be appreciated that the base 102 may include two or more raised ribs to engage the teeth 148 extending from the reel flanges 144. The door 110 may be pivoted relative to the base 102 to the first closed position and, optionally, may be secured and/or locked to the base 102, as would be understood by persons of ordinary skill in the art.

When it is desired to configure a telecommunications system with cable, for example, fiber optic cable, from the reel 140, the door 110 is pivoted relative to the base 102 to the second open position (FIG. 1). The second open position of the door 110 provides access to the reel 140 and allows a user to payout cable from the reel 140. In some aspects, a conduit, for example, a microduct, may be inserted through the grommeted opening 160 from the outside of the reel enclosure 100. The reel enclosure 100 may include a clamping member (not shown) configured to clamp and hold an end of the conduit that extends into the interior of the reel enclosure through the grommeted opening 160. The user then grasps the second end of the cable, which is accessible at the outer circumference of the wound cable on the reel 140, and begins paying out the cable by pushing the cable through the conduit. When the user completes the payout, the user can then grasp the first end of the cable from the exterior space delimited by the reel flanges 144 and connect the first end with a coupler (not shown) mounted to the back panel 112.

Referring now to FIGS. 5-11C, another embodiment of an exemplary reel enclosure, for example, for storing a reel of fiber optic cable and paying out the fiber optic cable, is illustrated. The reel enclosure 100 includes a base 202 having a back wall 204 and four side walls 206a-206d. The enclosure 200 may be a conventional multi-dwelling unit (MDU) enclosure, for example. The back wall 204 and the four side walls 206a-d define an interior 208, which can be closed by a cover 205. The cover can be pivotally coupled with the base 202, for example, via a hinge, or the cover can be coupled with the base 202 via an interference fit or press fit relationship. Of course, any conventional means for coupling the cover 205 with the base 202 is contemplated by this disclosure.

The reel enclosure 200 further includes a mounting panel 210 pivotally and removably coupled with the base 202. As shown in FIGS. 5-8, a pair of hinge receivers 212 are provided on a side wall 206a of the base 202, and the mounting panel 210 includes a corresponding pair of hinge members 222. The pair of hinge receivers 212 are configured to receive the hinge members 222 such that the mounting panel 210 is pivotable relative to the base 202. The hinge members 222 can be removed from the hinge receivers 212 by lifting the mounting panel 210 relative to the base 202, thereby removing the mounting panel 210 from the base 202. Although FIGS. 5-8 illustrate the mounting panel 210 being pivotally mounted to the same wall 206a of the base 202 as the cover 205, the mounting panel 210 and the cover 205 may be pivotally mounted to different walls 206a-d of the base 202.

The hinge receiver 212 includes an opening 214 at an upper end 216 thereof configured to receive a pin 224 of the hinge member 222. The upper end 216 of the hinge receiver 212 includes a notched portion 218 facing a direction opposite to the back wall 204 of the base 202 and toward the open side of the base 202 that is covered by the cover 205.

Figure 5:
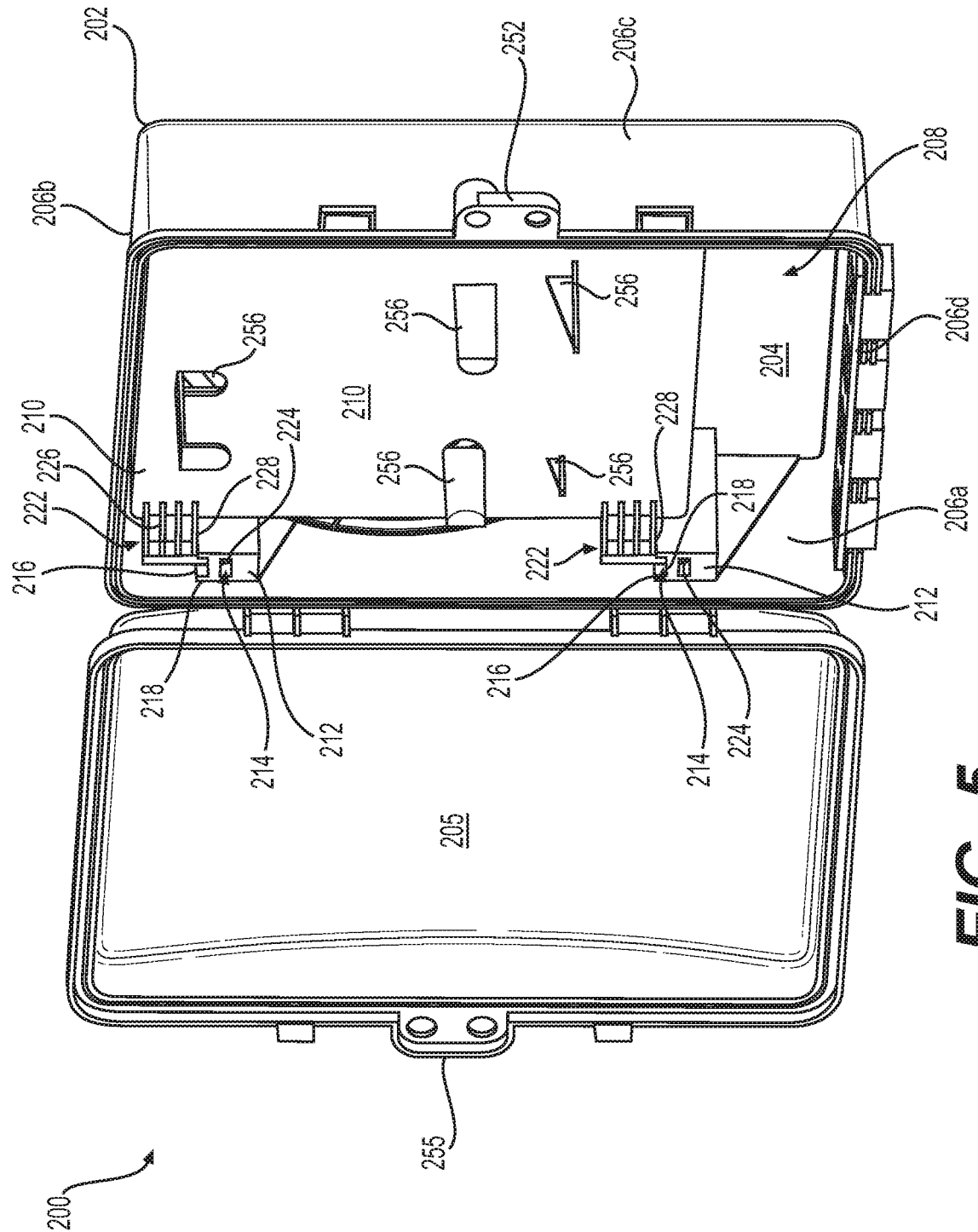
FIG. 5 is a perspective view of an exemplary reel enclosure with a mounting panel in a first position according to various aspects of the disclosure.
Figure 6:
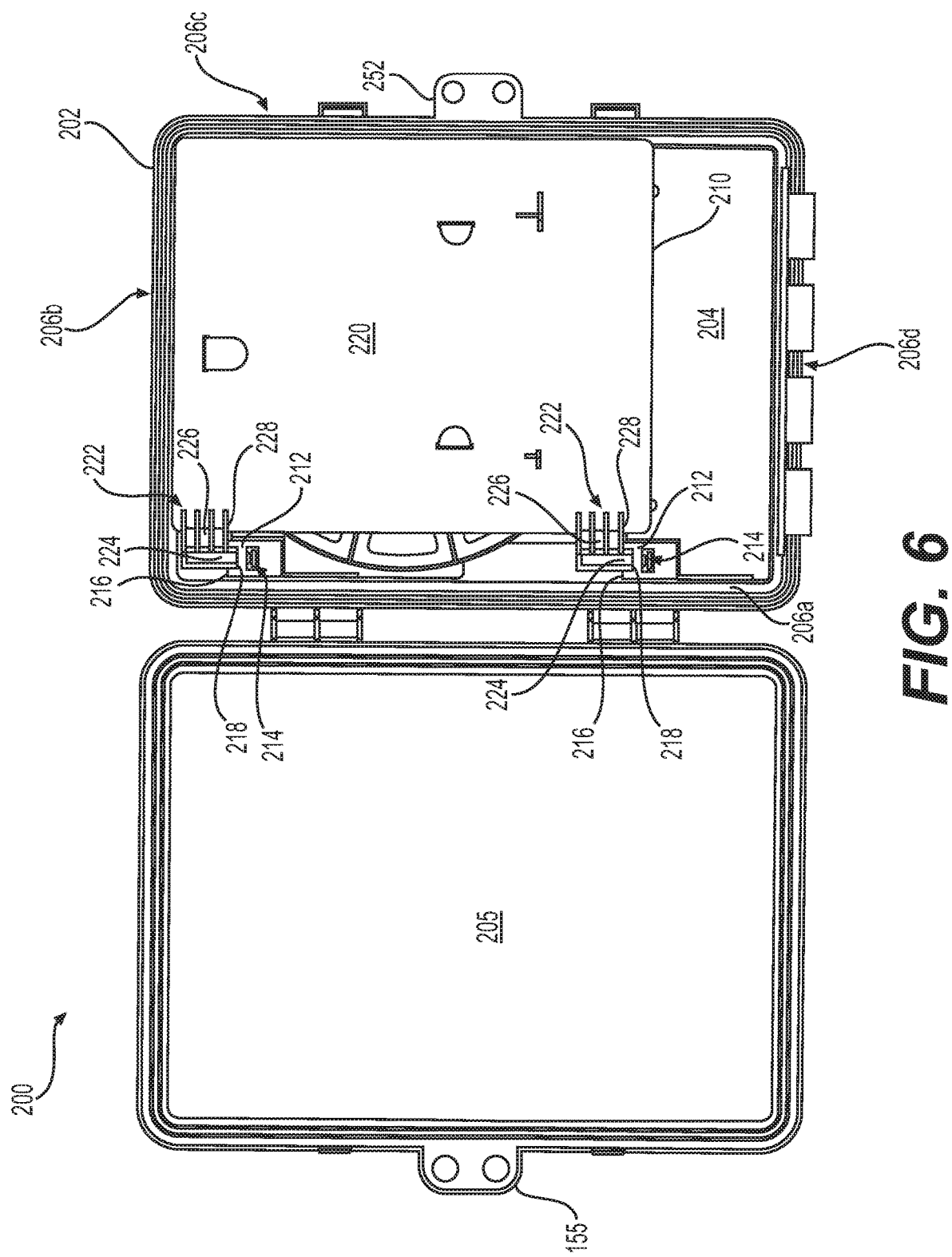
FIG. 6 is a front view of the exemplary reel enclosure of FIG. 5 with the mounting panel in the first position.
Figure 7:
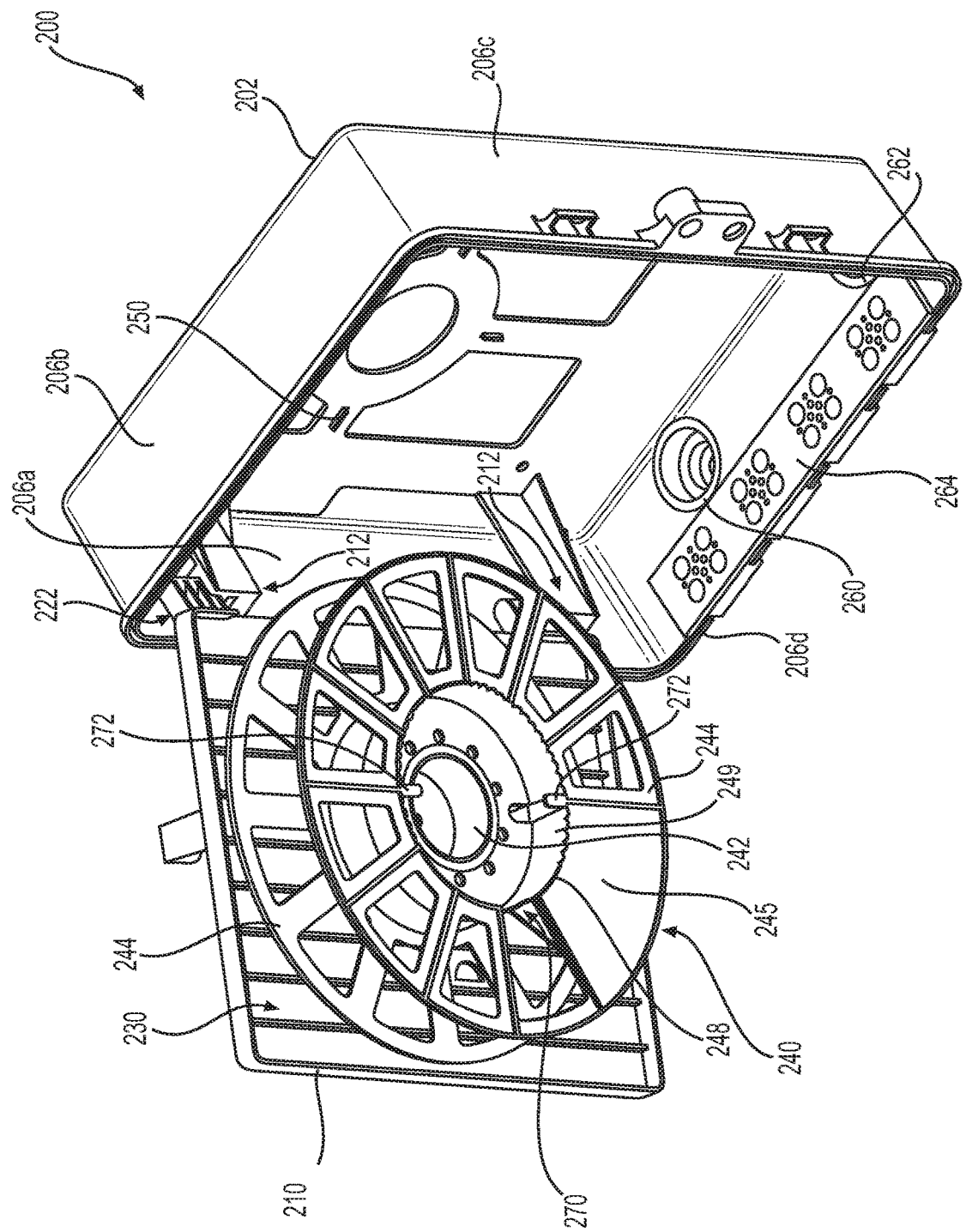
FIG. 7 is a perspective view of the exemplary reel enclosure of FIG. 5 with the mounting panel in a second position.
Figure 8:
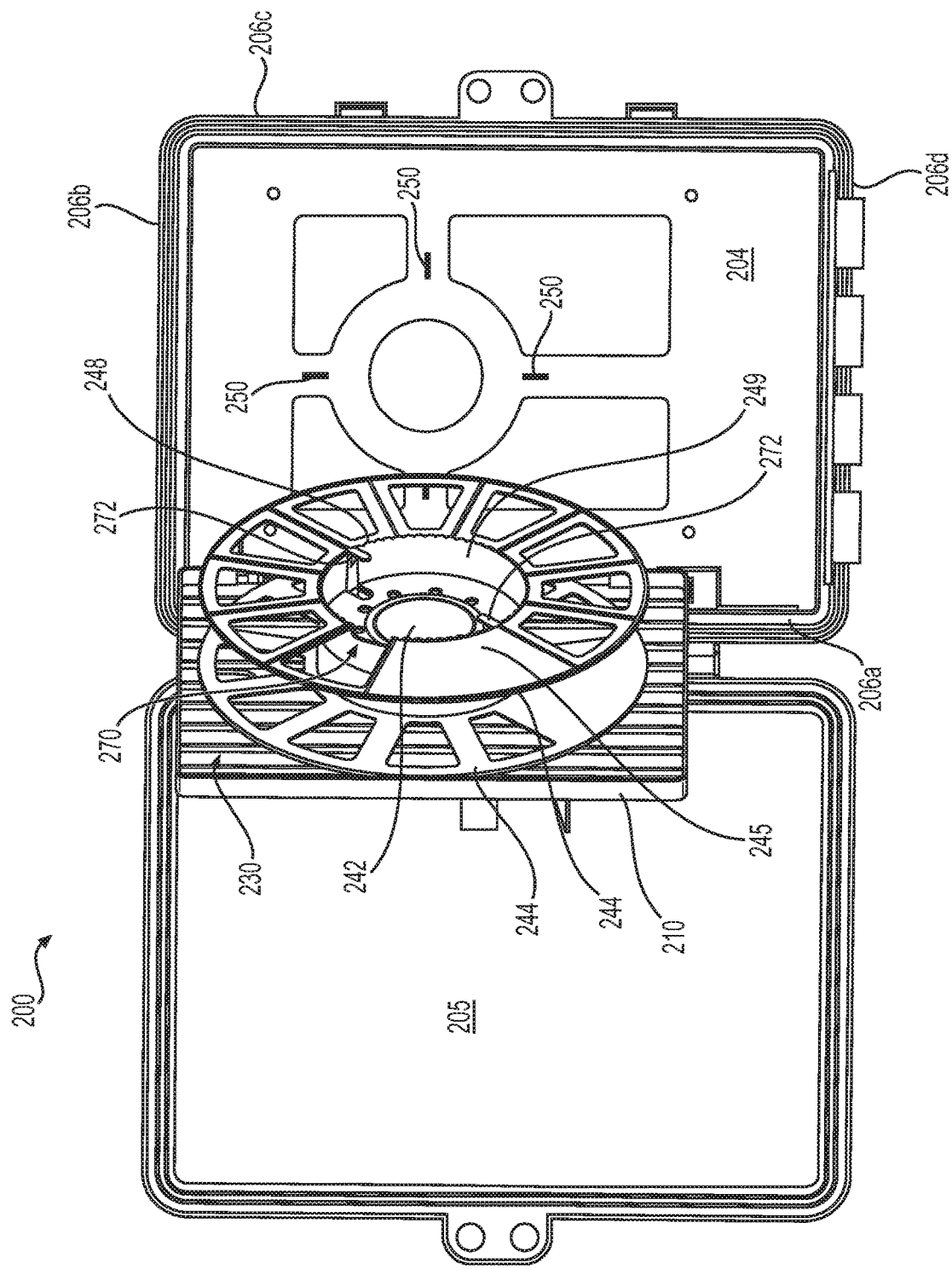
FIG. 8 is a front view of an exemplary reel enclosure of FIG. 5 with the mounting panel in the second position.

The hinge member 222 includes a flange 226 extending from a front surface 220 of the mounting panel 210, and the pin 224 extends from the flange 226 in a direction parallel to the mounting panel 210. The flange 226 extends from the front surface 220 of the mounting panel 210 at a predetermined angle, which will be discussed in more detail below. The hinge receiver 212 and the hinge member 222 permit the mounting panel 210 to pivot relative to the base 202 between a first closed position, as shown in FIGS. 5 and 6, and a second open position, as shown in FIGS. 7 and 8. As illustrated, in the first closed position, the mounting panel 210 blocks access to a reel of cable that is mounted to the mounting panel 210. In the second open position, the mounting panel 210 is configured to allow access to a reel of cable that is mounted to the mounting panel 210 and to hold the reel outside of an interior of the base in order to allow a user access to the reel and to facilitate payout of cable from the reel.

As shown in FIGS. 5 and 6, in the first position, a bottom surface 228 of the flange 226 rests on the upper end 216 of the hinge receiver 212. In the second position, as shown in FIGS. 7 and 8, the mounting panel 210 is pivoted to a position where the bottom surface 228 of the flange 226 is aligned with the notch 218 in the upper end 216 of the hinge receiver 212. The notch 218 is configured to accommodate the flange 226 such that the flange 226 moves downward relative to the hinge receiver 212 and into the notch 218. The flange 226 is sized and arranged such that when received in the notch 218, the mounting panel 210 is relatively stably held in a fixed position.

The flange 226 extends from the front surface 220 of the mounting panel 210 at a desired predetermined angle such that when the flange 226 received in the notch 218, the mounting panel 210 is disposed at a desired angle relative to the base 202. For example, in order to facilitate payout of cable from a reel 240 that is mounted to a back surface 230 of the mounting panel 210, the flange 226 may extend from the mounting panel 210 at an angle that permits the mounting panel 210 to form an angle of between 90° and 160° relative to the base 202. In some embodiments, the mounting panel 210 may form an angle of 120° relative to the base 202. Of course, the flange 226 can be configured such that the mounting panel 210 can be disposed at any desired angle relative to the base 202.

Figure 9:
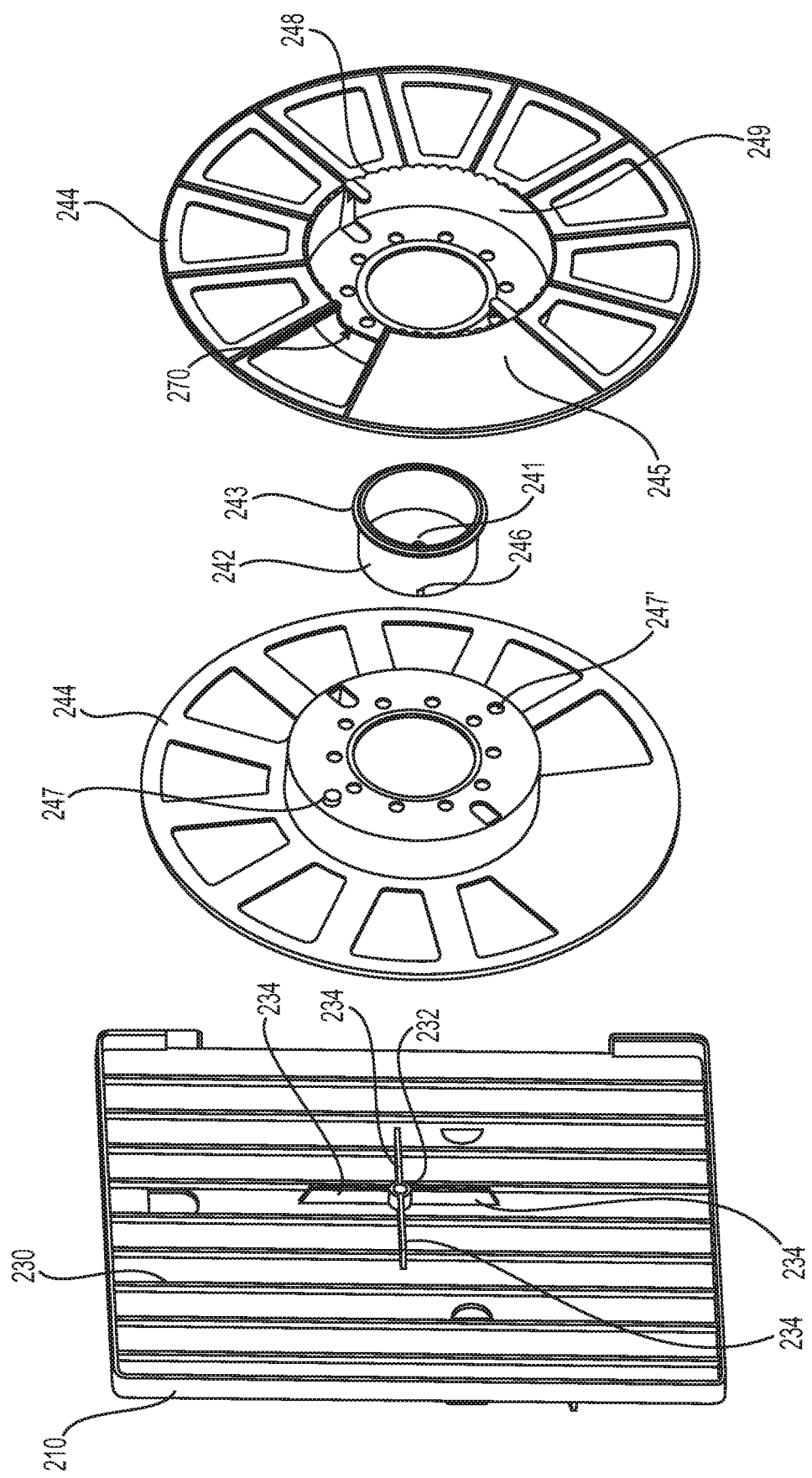
FIG. 9 is an exploded perspective view of the mounting panel and reel of the reel enclosure of FIG. 5.
Figure 10B:
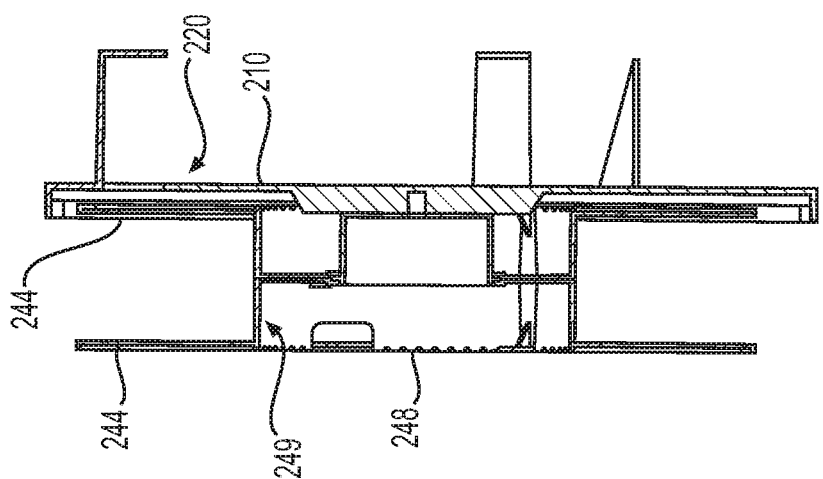
FIGS. 10A and 10B are front and cross-sectional views of the mounting panel and reel of the reel enclosure of FIG. 5.
Figure 10A:
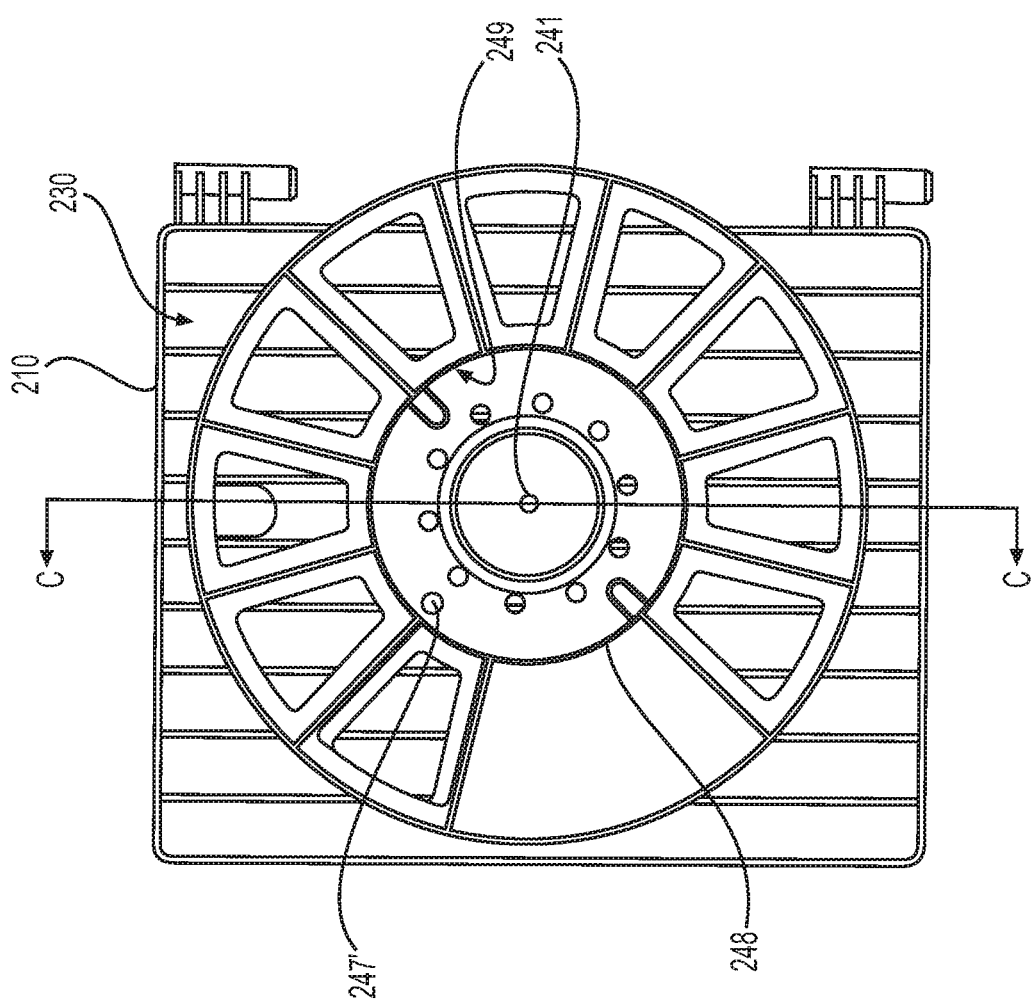

Referring to FIG. 9, the reel 240 includes a hub 242 and a pair of reel flanges 244. The reel flanges 244 may be identical structures that are oriented in opposite directions relative to one another and connected to one another with a bearing rim 243 of the hub 242 there between. For example, the reel flanges 244 may be secured to one another via press fit, interference fit, or another conventional connection, such as a projection 247 and complementary hole 247'. The reel 240 may be secured to the back surface 230 of the mounting panel 210 by a screw (not shown) that can be inserted through a center opening 241 in the hub 242 and screwed into a boss 232 on the back surface 230 of the mounting panel 210. The back surface 230 of the mounting panel 210 may include one or more raised structures 234 configured to cooperate with one or more reliefs 246 cut into the hub 242 to prevent rotation of the hub 242 relative to the mounting panel 210 in both the first and second positions of the mounting panel 210. The hub 212 is coupled with the reel flanges 244 such that the reel flanges 244 are rotatable relative to the hub 212 about the bearing rim 243. Thus, in the second open position shown in FIGS. 7 and 8, the reel flanges 244 are rotatable relative to the mounting panel 210 and the base 202 to permit payout of cable from the reel 240.

As shown in FIGS. 7 and 8, the back wall 204 of the base 202 includes one or more raised ribs 250, and the reel flanges 244 include a plurality of teeth 248 that are disposed about an inner periphery 249 of the reel flanges 244 and extend outward perpendicular to the outer faces 245 of the reel flanges 244. In the first closed position illustrated in FIGS. 5 and 6, one or more of the plurality of teeth 248 engage one or more corresponding raised ribs 250 to prevent rotation of the reel flanges 244 relative to the mounting panel 210 and the base 202, as shown in FIGS. 11B and 11C.

It should be appreciated that in some aspects, the mounting panel 210 may include a latch member (not shown) configured to cooperate with a latch member (not shown) on the base 202 in order to secure the mounting panel 210 to the base 202 in the first closed position. The base 202 and the cover 205 may also include structures 252, 255 configured to facilitate securement of the cover 205 with the base 202. It should also be appreciated that a wall of the base 202, for example, wall 206d, may include one or more grommeted openings 260, 262. Is some aspects, the grommeted opening 260 may be configured to receive a conduit, for example, a microduct, or a cable or the like from the outside of the reel enclosure 200. The wall 206d may also include a configurable manifold 264 that can be configured to receive up to sixteen cables of a desired diameter.

Referring again to FIGS. 5 and 6, the front surface 220 of the mounting panel 210 may include structures 256 configured to mount conventional hardware. For example, the structures 256 may be configured to mount a splitter such as, for example, a Belden FX splitter cassette.

Referring now to FIGS. 7-9, inner periphery 249 of the reel flanges 244 may include a cutout 270 along a portion of its circumference. The reel flanges 244 may include retaining members 272 extending radially inward from the inner periphery 249 of the reel flanges 244. The function of the cutout 270 and retaining member 272 are discussed below.

In use, the reel flanges 244, hub 242, and mounting panel 210 are coupled to one another as shown in FIGS. 7-9. As described above, the reel flanges 244 are rotatable together about the bearing rim 243 of the hub 242. The reel 240 is provided with cable, for example, fiber optic cable, wound around the center of the reel flanges 244, as would be understood by persons skilled in the art. A first end of the cable (not shown), for example, a pre-terminated end, may extend from the center of the reel flanges 244 through the cutout 270 and be wrapped within the inner circumference of the exterior space delimited by the reel flanges 244 and retained in the inner circumference by the retaining member 272. The second end of the cable, for example, a pre-terminated end, will be accessible at the outer circumference of the wound cable.

For transport and storage, the mounting panel 210 is coupled with the base 202 of the reel enclosure by inserting the pin 224 of the hinge member 222 of the mounting panel 210 into the opening 214 of the hinge receiver 212 of the base 202. The mounting panel 210 is lifted in an upward direction relative to the base 202 and rotated to the first closed position shown in FIGS. 5 and 6. In the first closed position, the bottom surface 228 of the flange 226 of the hinge member 222 rests on the upper end 216 of the hinge receiver 212. Also, in the first closed position, the teeth 248 extending from the outer faces 245 of the reel flanges 244 engage the raised ribs 250 extending into the enclosure space from the back wall 204 of the base 202. Although FIGS. 7 and 8 illustrate four raised ribs, it should be appreciated that the base 202 may include one, two, three, or more than four raised ribs to engage the teeth 248 extending from the reel flanges 244. The cover 205 may be pivoted relative to the base 202 to a closed position and, optionally, may be secured and/or locked to the base 202, as would be understood by persons of ordinary skill in the art.

When it is desired to configure a telecommunications system with cable, for example, fiber optic cable, from the reel 240, the cover 205 is pivoted relative to the base to provide access to the interior of the reel enclosure 200. The mounting panel 210 is pivoted relative to the base 202 to the second open position (FIGS. 7 and 8); that is, until the bottom surface 228 of the flange 226 of the hinge member 222 is aligned with the notched portion 218 of the hinge receiver 212. The bottom surface 228 of the flange 226 of the hinge member 212 is then received by the notched portion 218 to such that the mounting panel 210 is held at a desired predetermined angle relative to the base 202 in order to allow a user to payout cable from the reel 240. In some aspects, a conduit, for example, a microduct, may be inserted through the grommetted opening 260 from the outside of the reel enclosure 200. The reel enclosure 200 may include a clamping member (not shown) configured to clamp and hold an end of the conduit that extends into the interior of the reel enclosure through the grommeted opening 260. The user then grasps the second end of the cable, which is accessible at the outer circumference of the wound cable on the reel 240, and begins paying out the cable by pushing the cable through the conduit. When the user completes the payout, the user can then grasp the first end of the cable from the exterior space delimited by the reel flanges 244 and connect the first end with hardware mounted to the back surface 230 of the mounting panel 210. The user can then repeat the process of pivoting the mounting panel 210 back to the first closed position and pivoting the cover 205 to the closed position, as discussed above.

Meanwhile, a fiber drop cable enters through the right side grommet 162 at the bottom wall 106d of the base 102. The drop cable can be secured to the second support member 166, slack can be wound around the standoffs 127, 128 and can be coupled with the coupling member (e.g., an SC/APC adapter). Once the door 110 is closed, the reel is unable to rotate.

It should be appreciated that features of the two above-mentioned embodiments of reel enclosures can be interchanged. For example, in some embodiments, the door 110 of the reel enclosure 100 can be configured as a mounting panel similar to the mounting panel 210 of the reel enclosure 200, in which case the reel enclosure 100 could further include a cover similar to the cover 205 of the reel enclosure 200. Similarly, in some embodiments, the inside surface of the cover 205 of the reel enclosure 200 can be configured similar to the back surface 230 of the mounting panel 210, in which case the mounting panel 210 can be eliminated. Embodiments including the mounting panel may provide an ability to customize the reel enclosure for multiple users. Meanwhile, avoiding the back panel may simplify assembly and/or reduce costs.

Further, it should be appreciated that in some embodiments, the door 110 of the reel enclosure 100 and/or the cover 205 of the reel enclosure 200 can include hinges that include hinge members similar to the hinge members 222 of the reel enclosure 200, and the corresponding wall of the respective base 102, 202 can include hinge receivers similar to the hinge receivers 212 of the reel enclosure 200. Thus, the door 110 of the reel enclosure 100 and/or the cover 205 of the reel enclosure 200 can operate in a manner similar to the mounting panel 210 of the reel enclosure 200 to hold the door 110 and/or cover 205 at a predetermined angle relative to the respective base 102, 202.

It should be further appreciated that in some embodiments, the back wall 104 of the reel enclosure 100 could be configured similar to the back panel 112 with the features of the back panel 112 integrated into the back wall 104, in which case, the back panel 112 can be eliminated. Similarly, in some embodiments, the reel enclosure 200 can be configured to include a back panel similar to the back panel 112 of the reel enclosure 100. Embodiments including the back panel may provide an ability to customize the reel enclosure for multiple users. Meanwhile, avoiding the back panel may simplify assembly and/or reduce costs.

It should also be appreciated that the wall 106d of the reel enclosure 100 can be configured similar to the wall 206d of the reel enclosure 200 and vice versa, depending on the application for which the reel enclosure 100 is intended.

Referring now to FIGS. 12-15, another embodiment of an exemplary reel enclosure and fiber optic deployment kit 300 is illustrated. The fiber optic deployment kit 300 includes an enclosure 302 having a back wall 304 and four side walls 306a-306d. The enclosure 302 may be a conventional multi-dwelling unit (MDU) enclosure, for example. The back wall 304 and the four side walls 306a-d define an interior 308, which can be closed by a cover (not shown). The cover can be pivotally coupled with the enclosure 302, for example, via a hinge, or the cover can be coupled with the enclosure 302 via an interference fit or press fit relationship. Of course, any conventional means for coupling the cover with the enclosure 302 is contemplated by this disclosure.

Figure 13:
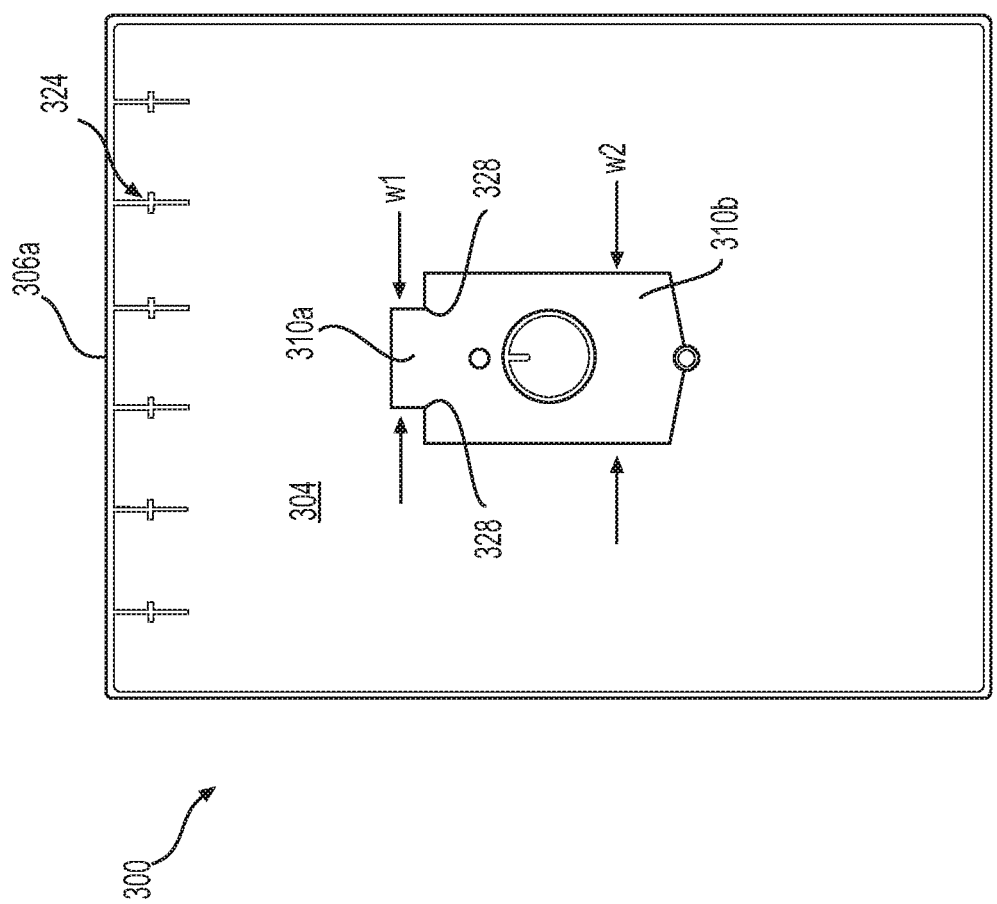
FIG. 13 is a front view of a first configuration of an enclosure and bracket of the exemplary fiber optic deployment kit shown in FIG. 12.

The fiber optic deployment kit 300 further includes a bracket 310 that can be removably mounted to the enclosure 302 at two distinct locations. Referring to FIG. 13, in a first configuration, the bracket 310 can be mounted to the back wall 304 of the enclosure 302. For example, one or more projections 312 may extend from the back wall 304 into the interior 308 of the enclosure 302. The bracket 310 may include a hole 314 and/or a recess 316 configured to receive the projections 312 such that the bracket 310 is not movable or pivotable relative to the enclosure 302 in the first configuration. The bracket 310 may also include an annular hub 318 extending from a side of the bracket 310. In the first configuration, the annular hub 318 extends in a direction away from the back wall 303 of the enclosure. The annular hub 318 may be configured to receive a complementary center hole in a spool 320. The spool 320 may include plural side-by-side windings of a cable (not shown) and a pair of spaced apart outer flanges 322.

Figure 14:
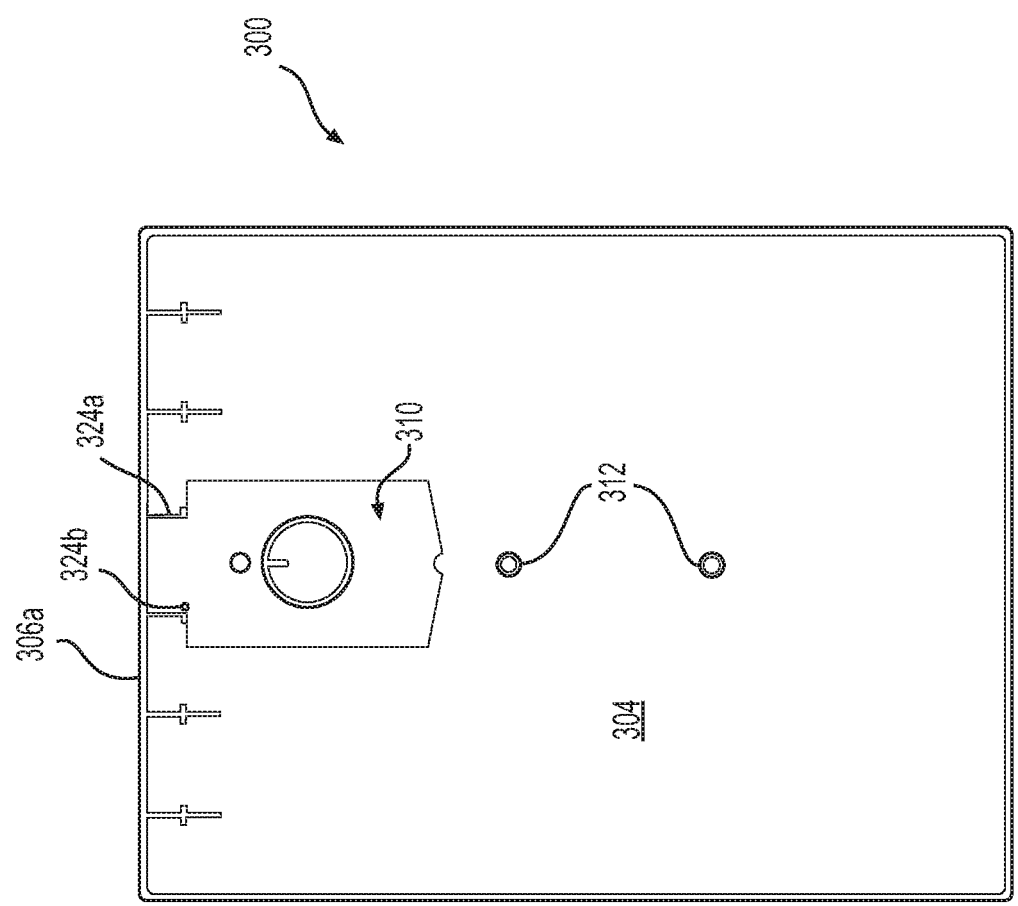
FIG. 14 is a front view of a second configuration of the enclosure and bracket of the exemplary fiber optic deployment kit shown in FIG. 12.
Figure 15:
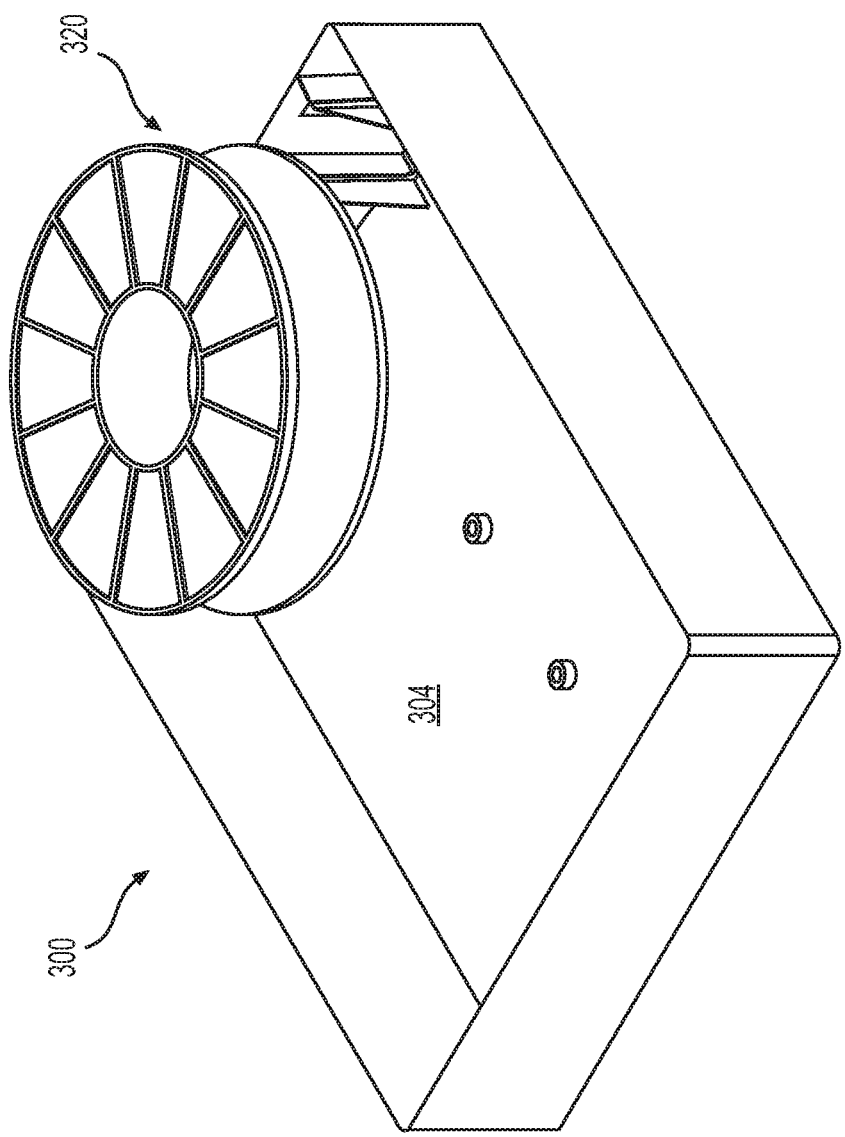
FIG. 15 is a perspective view of the exemplary fiber optic deployment kit shown in FIG. 12.
Figure 16:
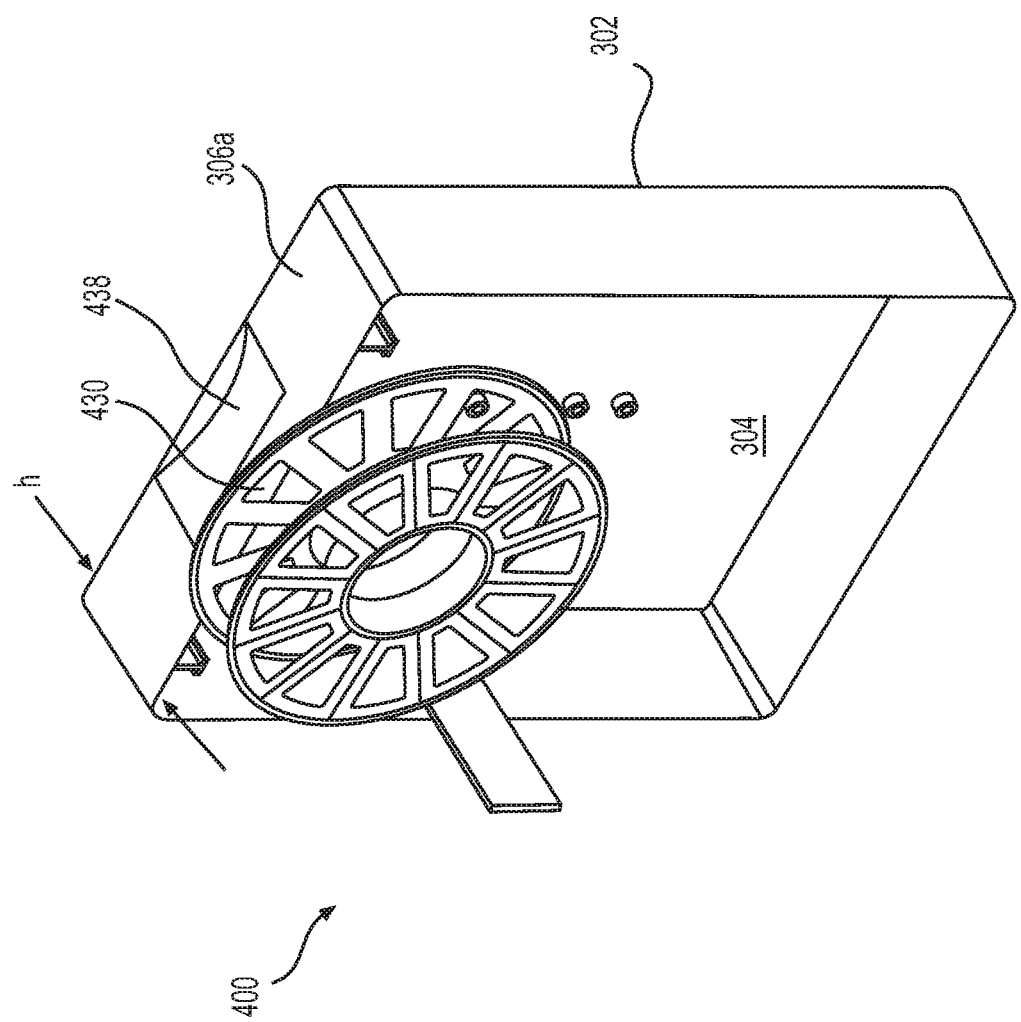
FIG. 16 is a perspective view of a second embodiment of an exemplary fiber optic deployment kit according to various aspects of the disclosure.
Figure 17:
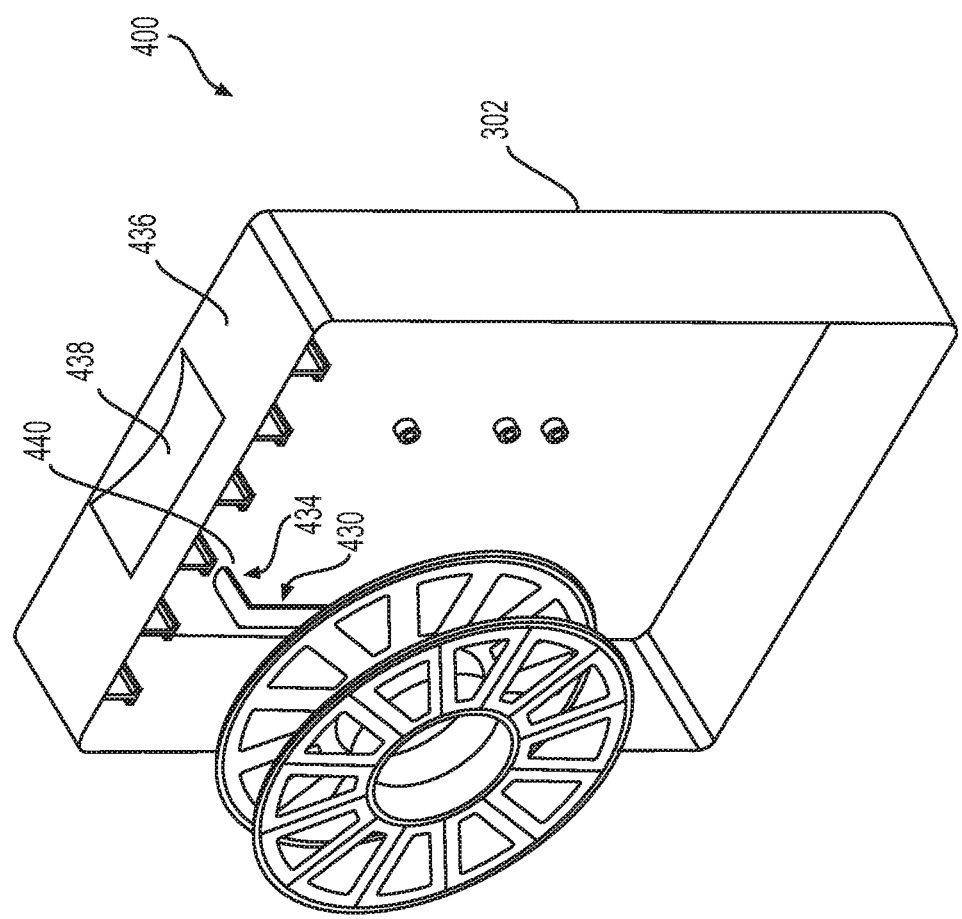
FIG. 17 is an exploded perspective view of the exempl31), fiber optic deployment kit shown in FIG. 16.

Referring to FIG. 14, in a second configuration, the bracket 310 can be mounted adjacent a side wall 306a of the enclosure 302. A plurality of ribs 324 may extend from the side wall 306a and the back wall 304 of the enclosure 302. For example, when view from the front, the ribs 324 have a cross shape, but when viewed from the perspective, the bottom 326 of the cross shape curves outward as the ribs 324 extend to the back wall 304. Thus, the ribs 324 extend further from the side wall 306a at the back wall 304 than at the end of the rib 324 furthest from the back wall 304.

The bracket 310 includes a first portion 310a having a first width w1 and a second portion 310b having a second width w2 that is greater than the first width w2. The bracket also includes a pair of slits 328 extending inward from opposite sides of the first portion 310a where the first portion 310a meets the second portion 310b in a length direction of the bracket 310. The first portion 310a is sized and arranged to fit between upright portions 324a of two adjacent ribs 324, while the slits 328 are sized and arranged to receive the cross portions 324b of the two adjacent ribs 324. The curved bottom 326 of the ribs 324 maintains the bracket 310 flush with a top end 302a of the enclosure 302 by preventing the bracket 310 from traveling along the ribs 324 toward the back wall 304.

In the second configuration, the bracket 310 is secured in place so as to be fixed relative to the enclosure 302. Meanwhile, the annular hub 318 permits the spool 320 to rotate relative to the bracket 310 and the enclosure 302. The second configuration may be a temporary position of the bracket 310 and the spool 320 used for paying out cable. The first configuration provides a storage position of the bracket 310 and the spool 320 within the enclosure 302.

In use, the bracket 310 and the spool 320 may be stored in the first configuration. When it is necessary to payout cable, the bracket 310 and the spool 320 are placed in the second configuration. Once the desired amount of cable has been deployed, the bracket 310 and the spool 320 can be moved to the first configuration for storage within the enclosure 302. Of course, the enclosure 302 is sized to receive the spool 320 in the interior 308 in the first configuration. It should be appreciated that while in the first configuration, the spool 320 may be prevented from rotating on the bracket 310 relative to the bracket 310 and the enclosure 302. For example, in some aspects, the projections 312 may engage complementary structures on the spool 320 to prevent such rotation.

Referring now to FIGS. 16-19, another embodiment of an exemplary fiber optic deployment kit 400 is illustrated. The fiber optic deployment kit 400 includes an enclosure 302 having a back wall 304 and four side walls 306a-106d. The enclosure 302 may be a conventional multi-dwelling unit (MDU) enclosure, for example. The back wall 304 and the four side walls 306a-d define an interior 308, which can be closed by a cover (not shown). The cover can be pivotally coupled with the enclosure 302, for example, via a hinge, or the cover can be coupled with the enclosure 302 via an interference fit or press fit relationship. Of course, any conventional means for coupling the cover with the enclosure 302 is contemplated by this disclosure.

Figure 19:
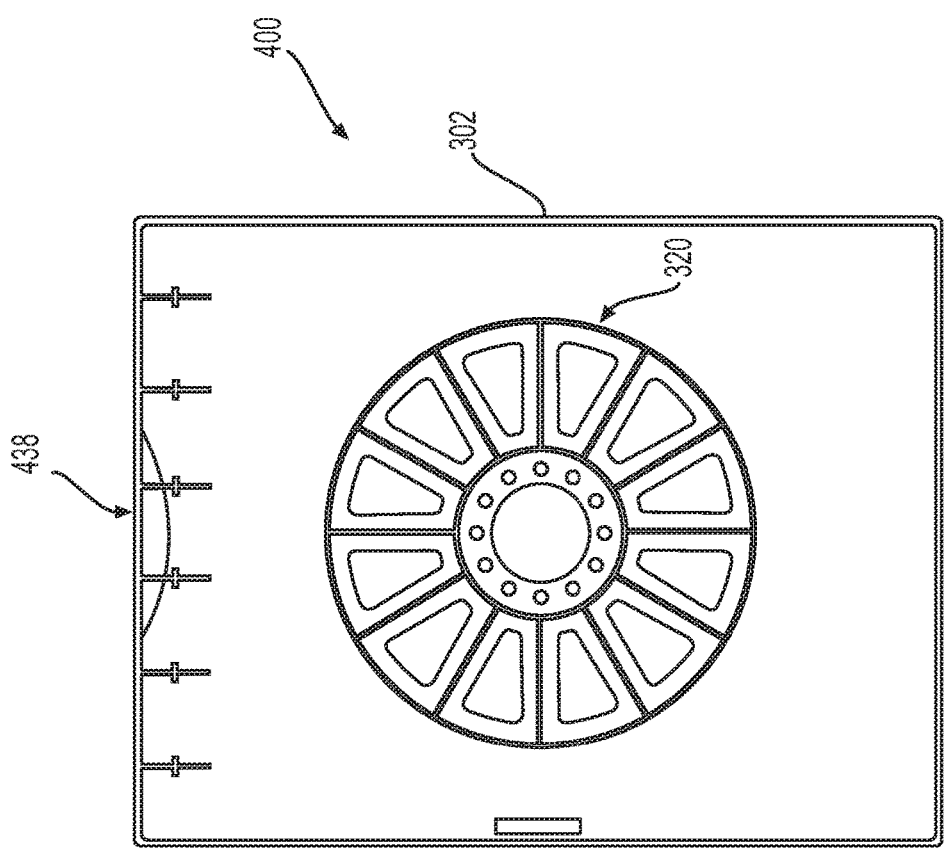
FIG. 19 is a front view of a first configuration of the exempl31)' fiber optic deployment kit shown in FIG. 16.
Figure 20:
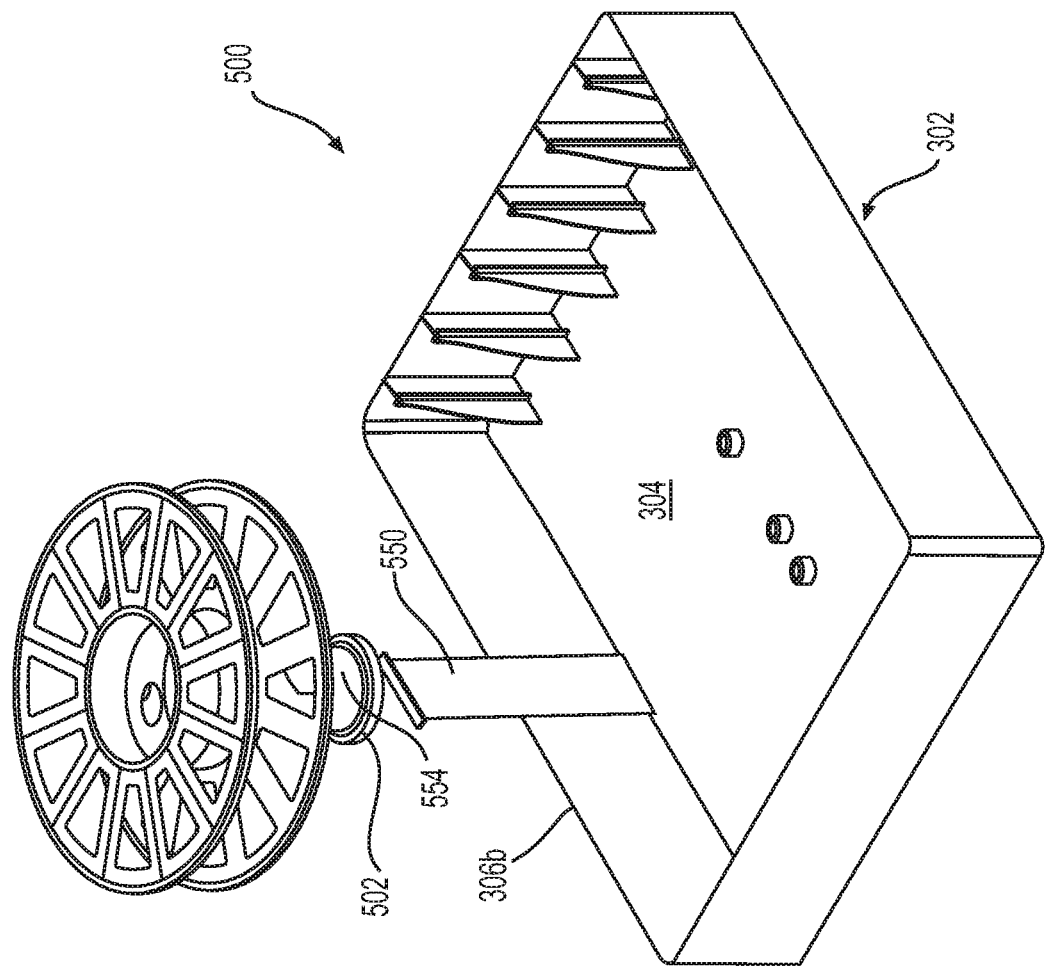
FIG. 20 is an exploded perspective view of a third embodiment of an exempl31)' fiber optic deployment kit according to various aspects of the disclosure.

The fiber optic deployment kit 300 further includes a hook 430 that can be removably coupled with the enclosure 302 such that the spool 320 can be removable mounted to the enclosure 302 at two distinct locations. Referring to FIG. 19, in a first configuration, the spool 320 can be mounted to the back wall 304 of the enclosure 302. For example, the projections 312 extending from the back wall 304 may engage complementary structures on the spool 320. Alternatively, a bracket or other structure may be mounted to the center hole 432 of the spool 320, and the bracket or other structure may, in turn, include complementary structures for receivably engaging the projections 312. For example, the bracket or other structure may be similar to the bracket 310 described above.

As shown in FIGS. 16-19, the hook 430 may be a squared S-shape, with a first portion 434 of the hook 430 being sized and arranged to removably couple with an exterior 436 of the side wall 306a. For example, in some aspects, the exterior 436 of the side wall 306a may include a slot 438 sized and arranged to receive a tip portion 440 of the first portion 434 of the hook 430. Alternatively, the first portion 434 may be sized to extend over the entire height h of the side wall 106a. The hook 430 may include a second portion 442 sized and arranged to be received by the center hole 432 of the spool 320. The second portion 442 may include a tip portion 444 configured to secure the spool 320 from falling off the hook 430.

Figure 18:
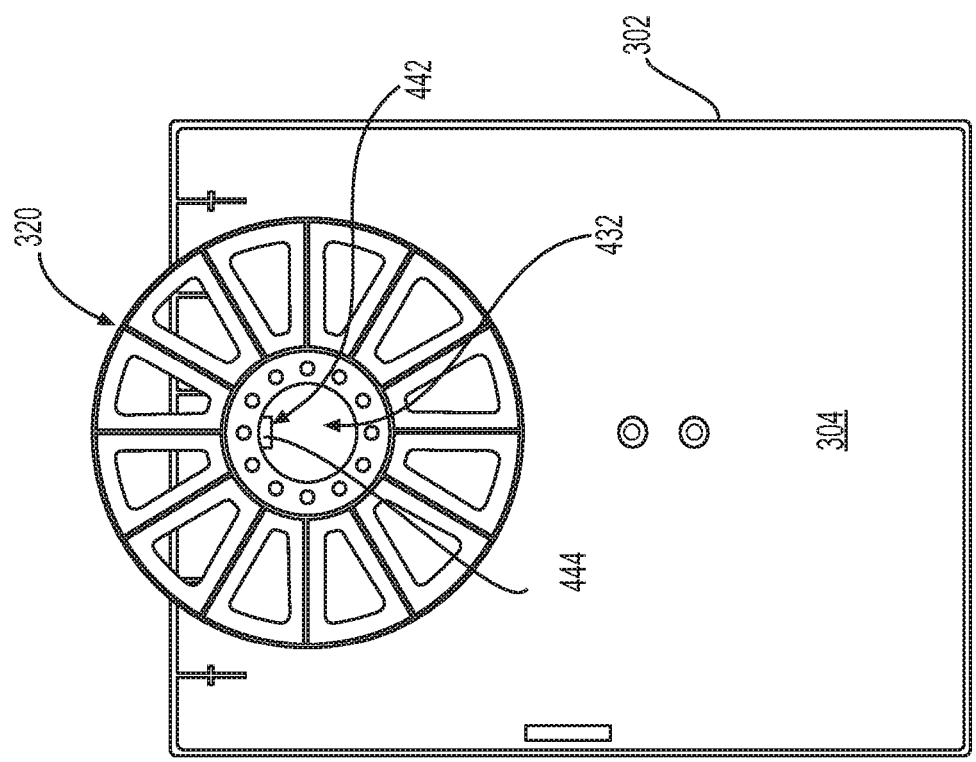
FIG. 18 is a front view of a second configuration of the exempl31), fiber optic deployment kit shown in FIG. 16.

In a second configuration, as shown in FIG. 18, the hook 430 is secured in place so as to be fixed relative to the enclosure 302. Meanwhile, the second portion 442 permits the spool 320 to rotate relative to the hook 430 and the enclosure 302. The second configuration may be a temporary position of the hook 430 and the spool 320 used for paying out cable. The first configuration provides a storage position of the spool 320 within the enclosure 302.

In use, the spool 320 may be stored in the first configuration. When it is necessary to payout cable, the hook 430 and the spool 320 are placed in the second configuration, which holds the spool 320 at a position outside the interior 308 of the enclosure 302. Once the desired amount of cable has been deployed, the spool 320 can be moved to the first configuration for storage within the enclosure 302. Of course, the enclosure 302 is sized to receive the spool 320 in the interior 308 in the first configuration. It should be appreciated that while in the first configuration, the spool 320 may be prevented from rotating relative to the enclosure 302. For example, in some aspects, the projections 312 may engage complementary structures on the spool 320 to prevent such rotation.

Referring now to FIGS. 20-23, another embodiment of an exemplary fiber optic deployment kit 500 is illustrated. The fiber optic deployment kit 500 includes an enclosure 302 having a back wall 304 and four side walls 306a-306d. The enclosure 302 may be a conventional multi-dwelling unit (MDU) enclosure, for example. The back wall 304 and the four side walls 306a-d define an interior 308, which can be closed by a cover (not shown). The cover can be pivotally coupled with the enclosure 302, for example, via a hinge, or the cover can be coupled with the enclosure 302 via an interference fit or press fit relationship. Of course, any conventional means for coupling the cover with the enclosure 302 is contemplated by this disclosure.

The fiber optic deployment kit 300 further includes a flange 550 that extends from the back wall 304 of the enclosure 302 at a location that is adjacent a side wall 306b and a hub 552 that can be removably coupled with the center hole 432 of the spool 320. The hub 552 can be removably coupled with the enclosure 550 such that the spool 320 can be removable mounted to the enclosure 302 at two distinct locations. For example, the hub 552 may include a slot 554 for receiving the flange 550. The flange 550 may include a lip 556 at its end to prevent the hub 552 from falling off the flange 550 when paying out cable from the spool 320.

Figure 22:
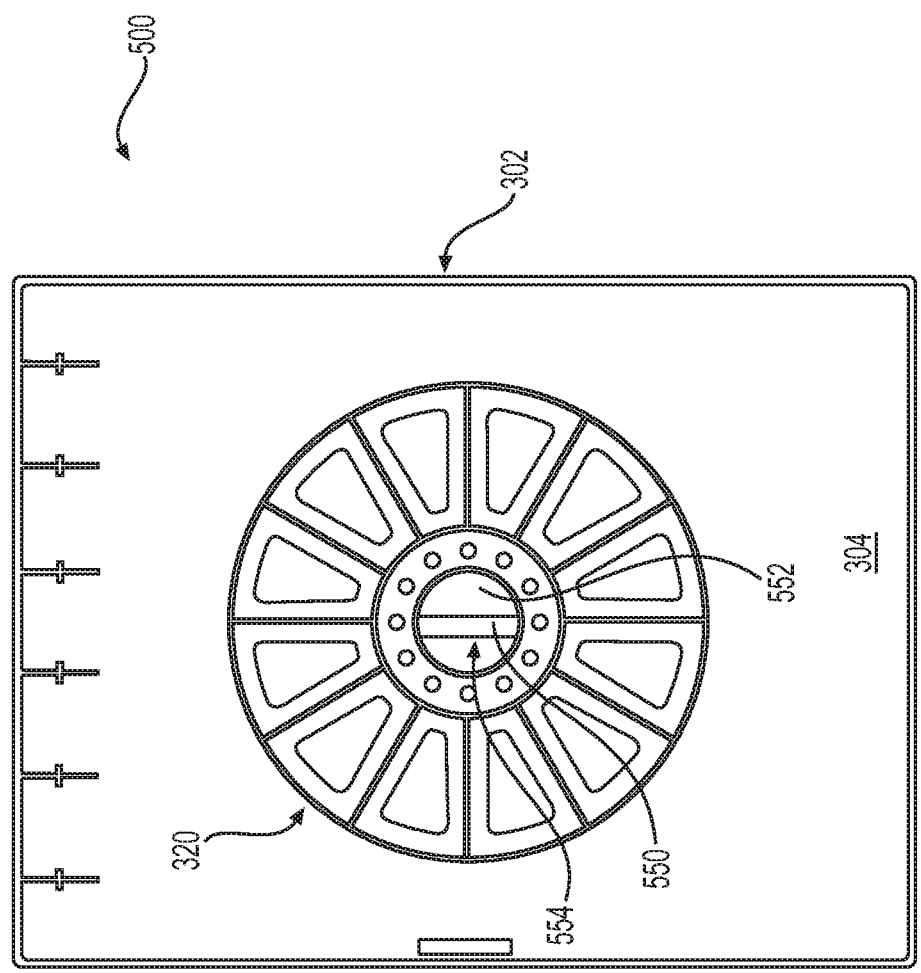
FIG. 22 is a front view of a first configuration of the exemplary fiber optic deployment kit shown in FIG. 20.

Referring to FIG. 22, in a first configuration, the spool 320 can be mounted to the back wall 304 of the enclosure 302. For example, the projections 312 extending from the back wall 304 may engage complementary structures on the spool 320. Alternatively, the hub 552 may include complementary structures for receivably engaging the projections 312.

Figure 21:
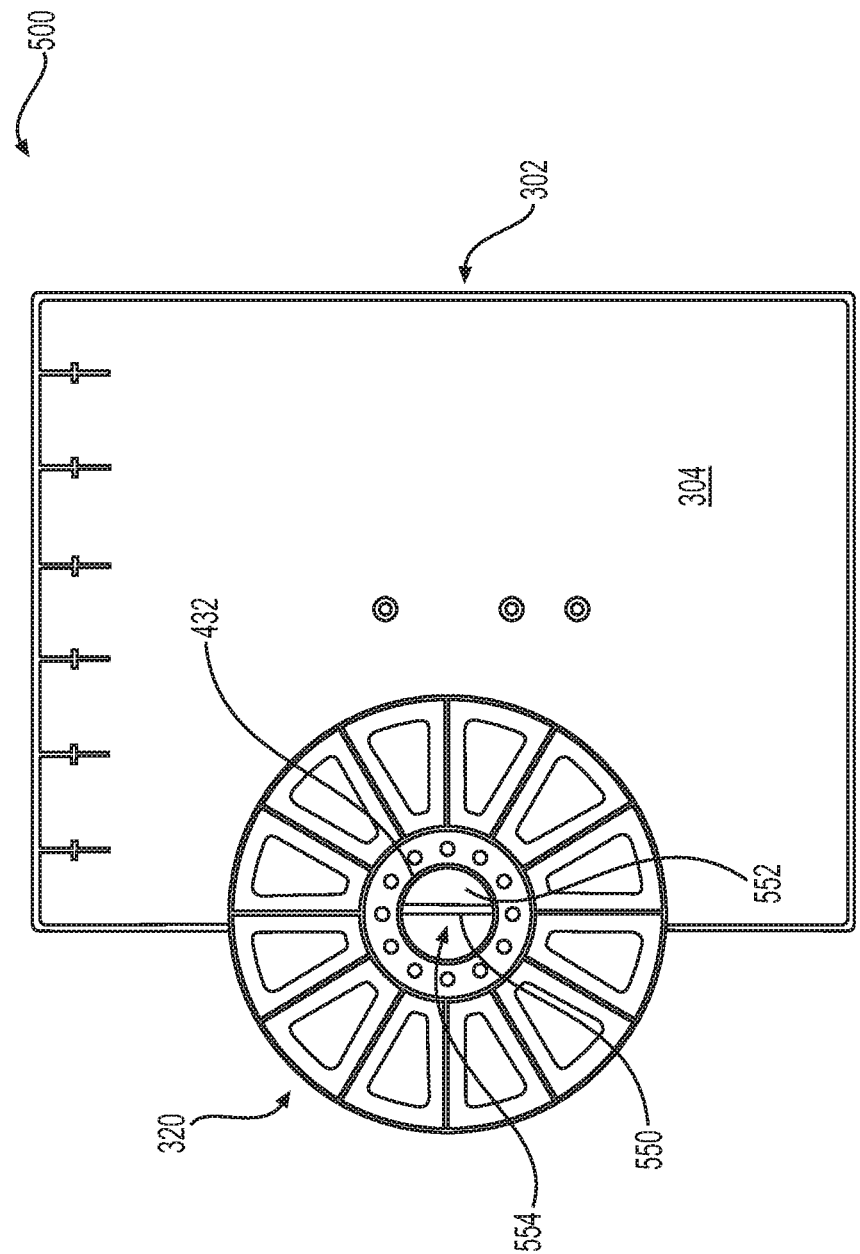
FIG. 21 is a front view of a second configuration of the exemplary fiber optic deployment kit shown in FIG. 20.

In a second configuration, as shown in FIG. 21, the hub 552 is secured in place so as to be fixed relative to the enclosure 302. Meanwhile, the hub 552 includes an annular rim 558 that receives the center hole of the spool 320 and permits the spool 320 to rotate relative to the hub 552 and the enclosure 302. The second configuration may be a temporary position of the hub 552 and the spool 320 used for paying out cable. The first configuration provides a storage position of the hub 552 and the spool 320 within the enclosure 302.

In use, the spool 320 and the hub 552 may be stored in the first configuration. When it is necessary to payout cable, the hub 552 and the spool 320 are placed in the second configuration, which holds the spool 320 at a position outside the interior 308 of the enclosure 302. Once the desired amount of cable has been deployed, the spool 320 and the hub can be moved to the first configuration for storage within the enclosure 302. Of course, the enclosure 302 is sized to receive the spool 320 in the interior 308 in the first configuration. It should be appreciated that while in the first configuration, the spool 320 may be prevented from rotating relative to the enclosure 302. For example, in some aspects, the projections 312 may engage complementary structures on the spool 320 to prevent such rotation.

Figure 23:
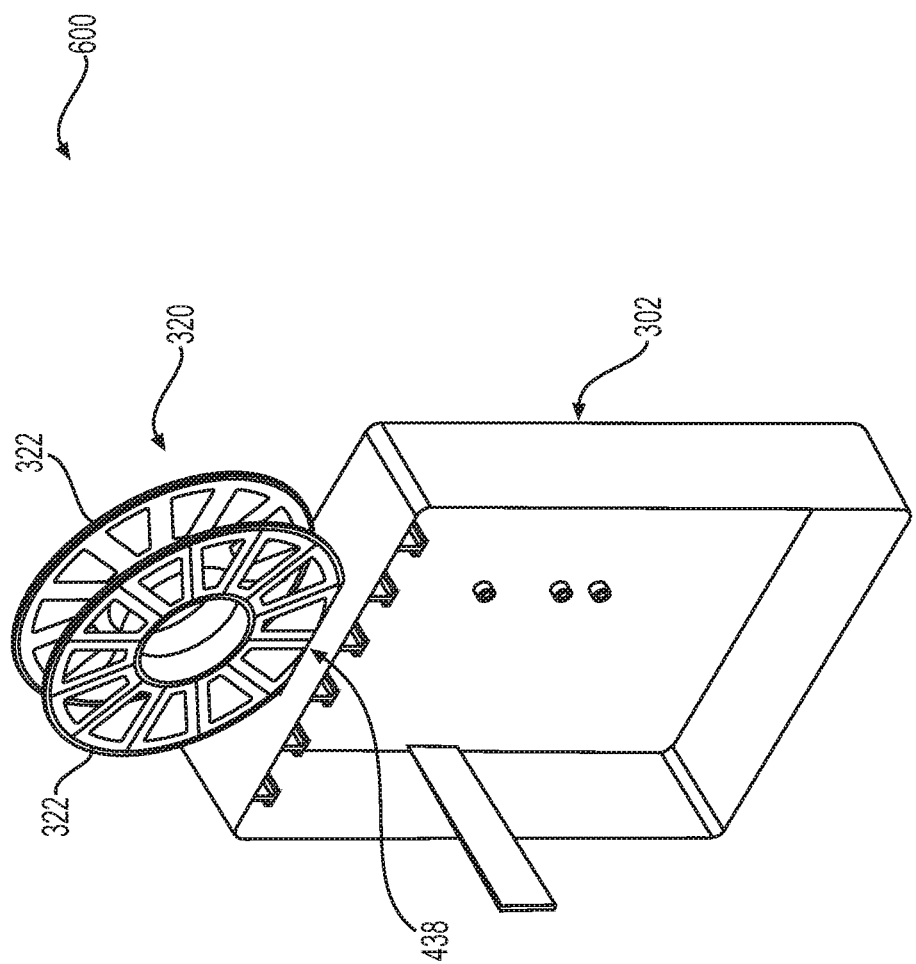
FIG. 23 is a perspective view of a fourth embodiment of an exemplary fiber optic deployment kit according to various aspects of the disclosure.
Figure 24:
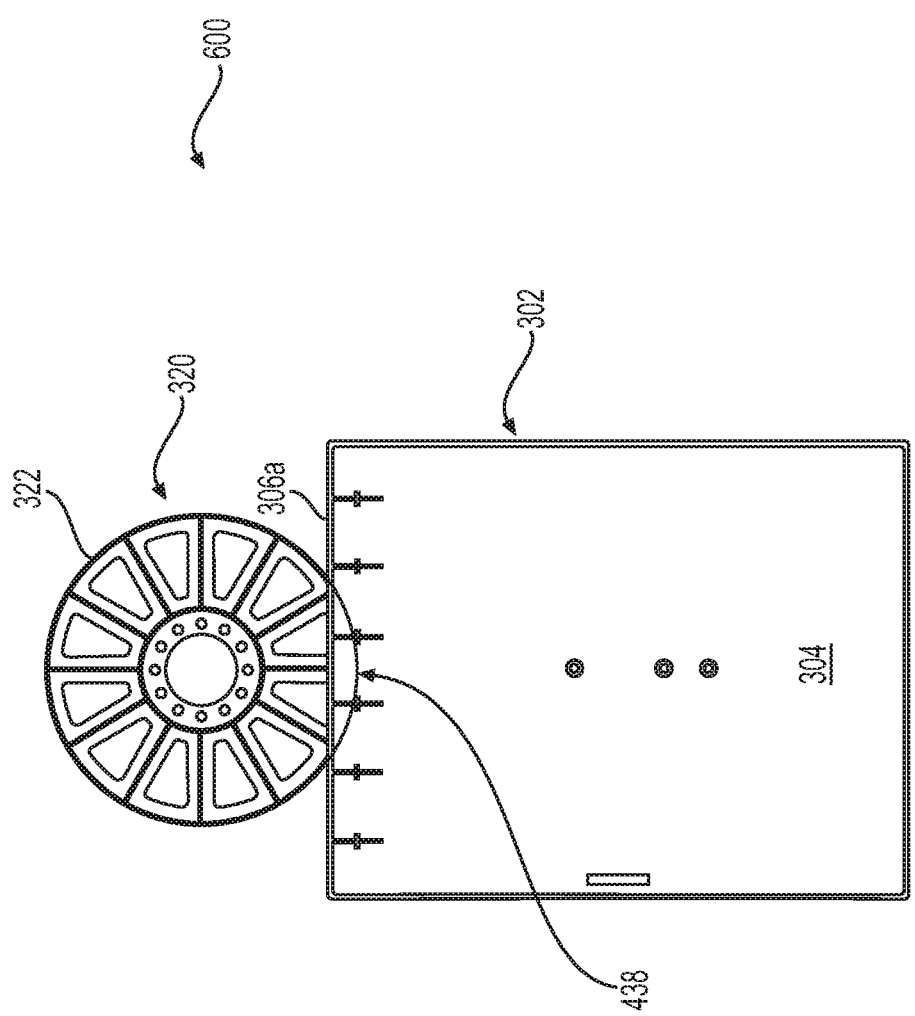
FIG. 24 is a front view of a second configuration of the exempl31)' fiber optic deployment kit shown in FIG. 23.
Figure 25:
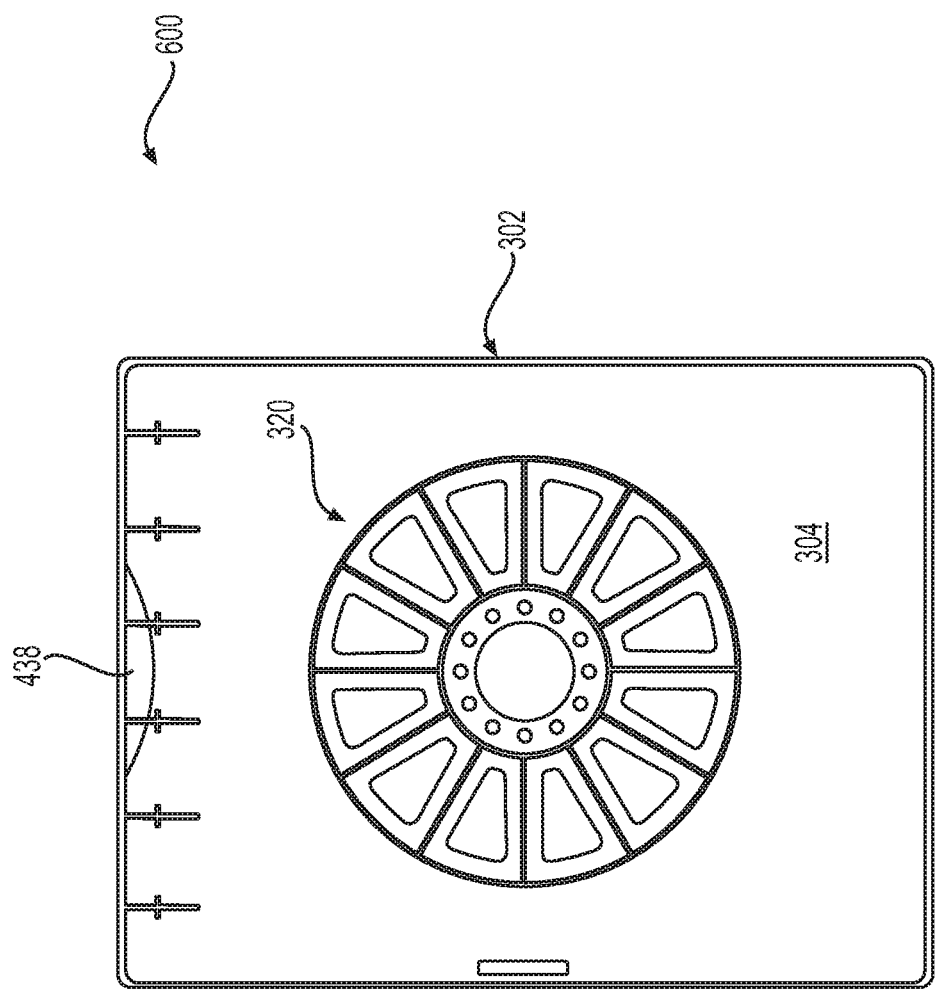
FIG. 25 is a front view of a first configuration of the exemplary fiber optic deployment kit shown in FIG. 23.

Referring now to FIGS. 23-25, another embodiment of an exemplary fiber optic deployment kit 600 is illustrated. The fiber optic deployment kit 600 includes an enclosure 302 having a back wall 304 and four side walls 306*a*-306*d*. The enclosure 302 may be a conventional multi-dwelling unit (MDU) enclosure, for example. The back wall 304 and the four side walls 306*a*-*d* define an interior 308, which can be closed by a cover (not shown). The cover can be pivotally coupled with the enclosure 302, for example, via a hinge, or the cover can be coupled with the enclosure 302 via an interference fit or press fit relationship. Of course, any conventional means for coupling the cover with the enclosure 302 is contemplated by this disclosure.

The exterior 436 of the side wall 306*a* may include a slot 438 sized and arranged to receive the outer flanges 322 of the spool 320 in a second configuration, as shown in FIGS. 23 and 24. The slot 438 may be sized and arranged to receive the outer flanges 322 and permit the spool 320 to rotate relative to the enclosure 320 so that cable can be paid out from the spool 320 while retaining the spool 320 in the slot 438.

Referring to FIG. 25, in a first configuration, the spool 320 can be mounted to the back wall 304 of the enclosure 302. For example, the projections 312 extending from the back wall 304 may engage complementary structures on the spool 320. Alternatively, a bracket or other structure may be mounted to the center hole 432 of the spool 320, and the bracket or other structure may, in turn, include complementary structures for receivably engaging the projections 312. For example, the bracket or other structure may be similar to the bracket 310 described above.

In use, the spool 320 may be stored in the first configuration. When it is necessary to payout cable, the spool 320 is placed in the second configuration, which holds the spool 320 at a position outside the interior 308 of the enclosure 302. Once the desired amount of cable has been deployed, the spool 320 can be moved to the first configuration for storage within the enclosure 302. Of course, the enclosure 302 is sized to receive the spool 320 in the interior 308 in the first configuration. It should be appreciated that while in the first configuration, the spool 320 may be prevented from rotating relative to the enclosure 302. For example, in some aspects, the projections 312 may engage complementary structures on the spool 320 to prevent such rotation.

Figure 27:
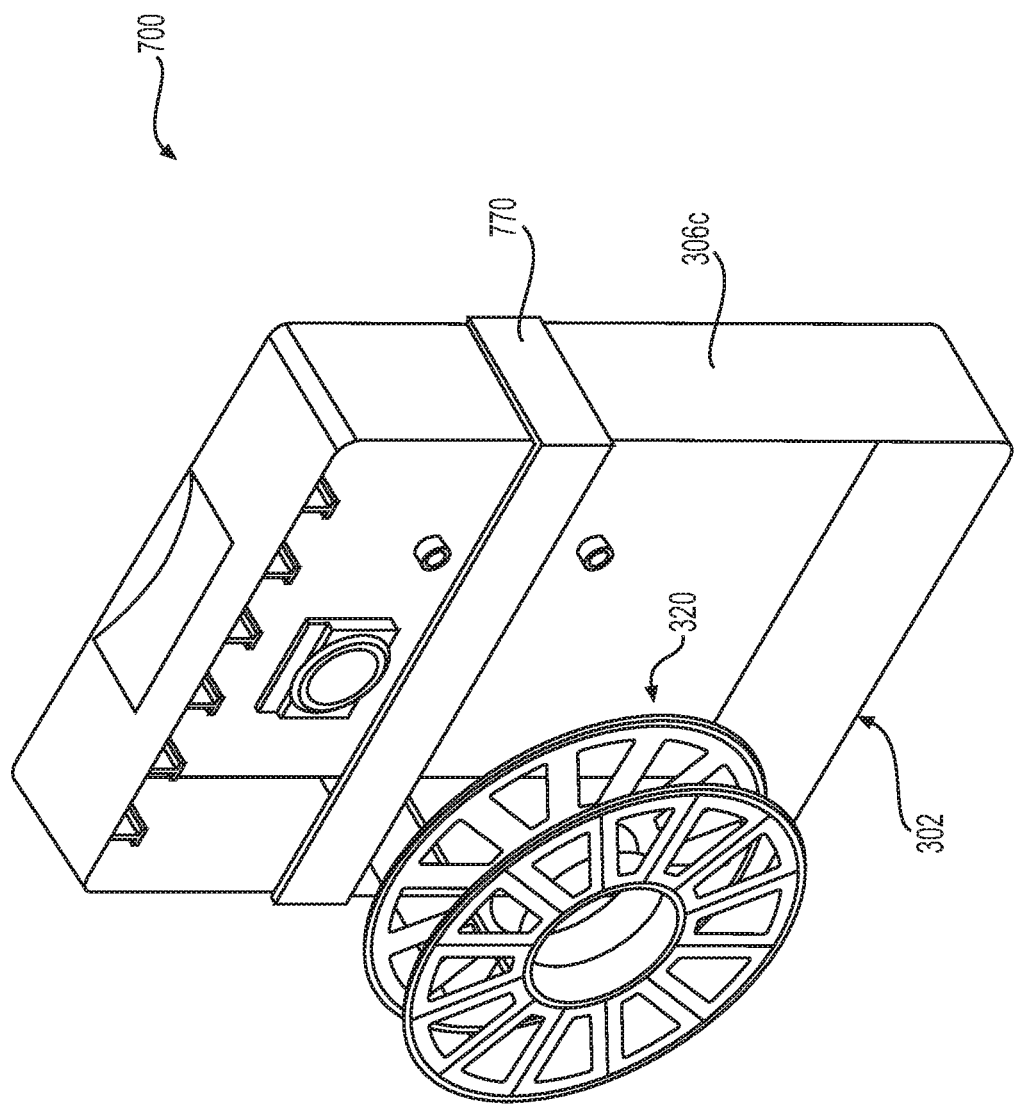
FIG. 27 is an exploded perspective view of the exemplary fiber optic deployment kit shown in FIG. 26.
Figure 28:
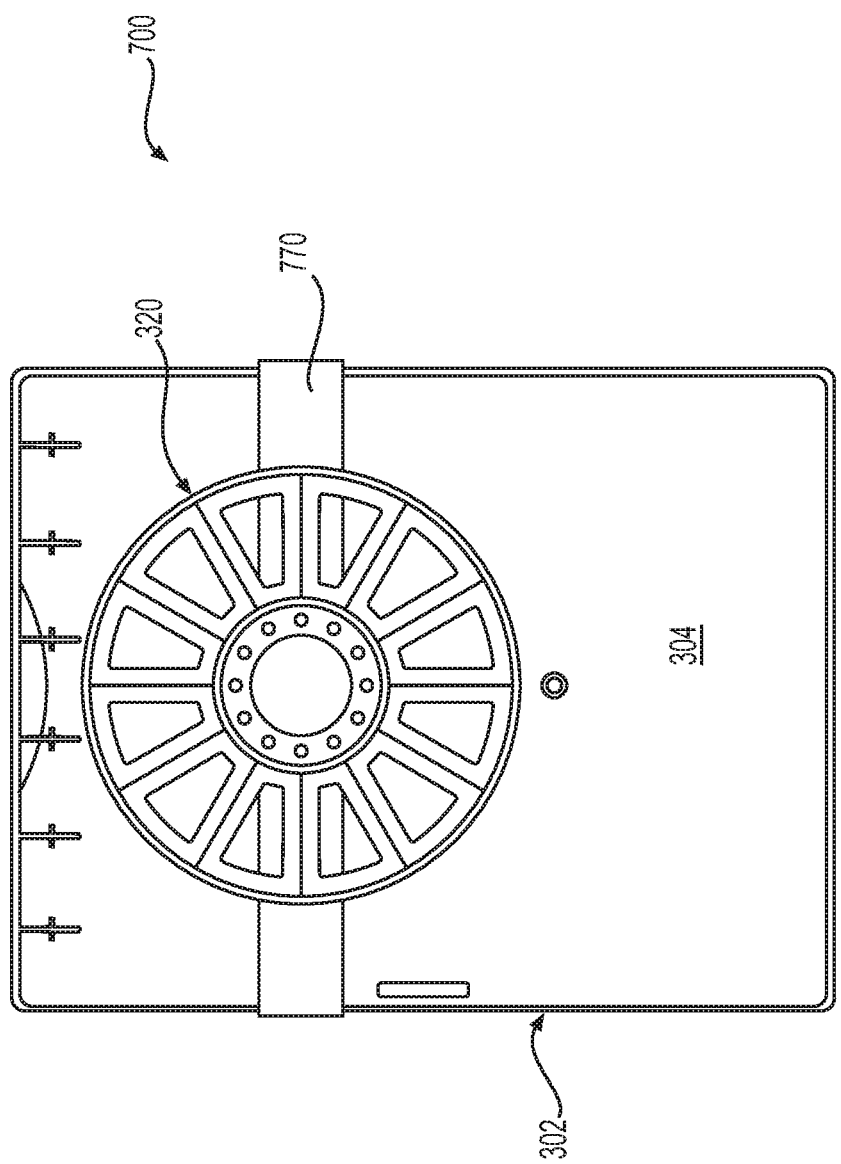
FIG. 28 is a front view of the exemplary fiber optic deployment kit shown in FIG. 26.

Referring now to FIGS. 27-29, another embodiment of an exemplary fiber optic deployment kit 700 is illustrated. The fiber optic deployment kit 700 includes an enclosure 302 having a back wall 304 and four side walls 306*a*-306*d*. The enclosure 302 may be a conventional multi-dwelling unit (MDU) enclosure, for example. The back wall 304 and the four side walls 306*a*-*d* define an interior 308, which can be closed by a cover (not shown). The cover can be pivotally coupled with the enclosure 302, for example, via a hinge, or the cover can be coupled with the enclosure 302 via an interference fit or press fit relationship. Of course, any conventional means for coupling the cover with the enclosure 302 is contemplated by this disclosure.

The fiber optic deployment kit 700 further includes a band 770, for example, an elastomeric band. The band 770 may be configured to extend around two side walls 306*b*, 306*c*, the back wall 304, and the open front 772 of the enclosure 302. The band 770 can be removably coupled with the enclosure 302 such that the spool 320 can be removable mounted to the enclosure 302 at two distinct locations.

In a first configuration, as described in the above embodiments, the spool 320 can be mounted to the back wall 304 of the enclosure 302. For example, the projections 312 extending from the back wall 304 may engage complementary structures on the spool 120. Alternatively, a bracket or other structure may be mounted to the center hole 432 of the spool 320, and the bracket or other structure may, in turn, include complementary structures for receivably engaging the projections 312. For example, the bracket or other structure may be similar to the bracket 310 described above.

Figure 26:
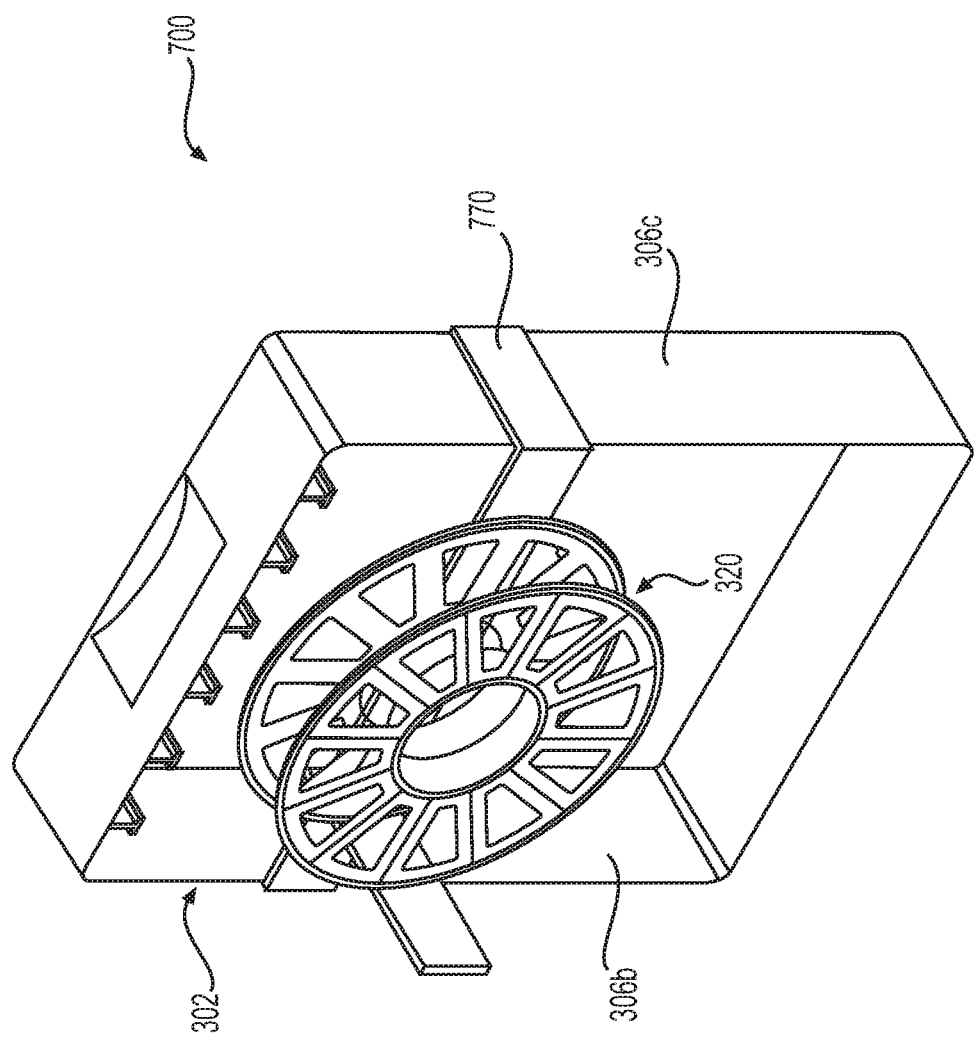
FIG. 26 is a perspective view of a fifth embodiment of an exemplary fiber optic deployment kit according to various aspects of the disclosure.

In a second configuration, as shown in FIGS. 26 and 28, the band 770 is secured in place so as to be fixed relative to the enclosure 302. The band 770, in turn, is secured to the spool 320, for example, by a bracket, hub, or other connecting structure that couples with the band 770 and allows the spool 320 to rotate relative to the band 770. The second configuration may be a temporary position of the band 770 and the spool 320 used for paying out cable. The first configuration provides a storage position of the spool 320 within the enclosure 302.

In use, the spool 320 may be stored in the first configuration. When it is necessary to payout cable, the band 770 and the spool 320 are placed in the second configuration, which holds the spool 320 at a position outside the interior 308 of the enclosure 302. Once the desired amount of cable has been deployed, the spool 320 can be moved to the first configuration for storage within the enclosure 302. Of course, the enclosure 302 is sized to receive the spool 320 in the interior 308 in the first configuration. It should be appreciated that while in the first configuration, the spool 320 may be prevented from rotating relative to the enclosure 302. For example, in some aspects, the projections 312 may engage complementary structures on the spool 320 to prevent such rotation.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A reel enclosure, comprising:
   a base; and
   a panel pivotally coupled to the base and movable between a first closed position and a second open position,
   wherein the panel is configured to hold a reel at an interior surface of the panel, the reel being configured to have cable wound thereon,
   wherein, in the first closed position, the base is configured to prevent the reel from rotating relative to the panel and the base, and
   wherein, in the second open position, the panel is configured to hold the reel outside of an interior of the base and outside of an interior cavity of the panel and to permit the reel to rotate relative to the panel and the base.

2. The reel enclosure of claim 1, wherein the panel is coupled to the base by a hinge connection, the hinge connection including a hinge receiver on a side wall of the base and a hinge member on the panel, the hinge receiver being configured to receive the hinge member.

3. The reel enclosure of claim 2, wherein the hinge receiver has an upper end with an opening configured to receive a pin of the hinge member,
   wherein the upper end of the hinge receiver includes a notched portion facing a direction opposite to a back wall of the base and toward an open side of the base,
   wherein the hinge member includes a flange extending from a front surface of the panel, the pin extends from the flange in a direction parallel to the panel, and the flange extends from the front surface of the mounting panel at a predetermined angle,
   wherein in the first closed position, a bottom surface of the flange rests on the upper end of the hinge receiver, and
   wherein in the second position, the panel is pivoted to a position where the bottom surface of the flange is aligned with the notch in the upper end of the hinge receiver, and the notch is configured to accommodate the flange such that the flange moves downward relative to the hinge receiver and into the notch.

4. The reel enclosure of claim 3, wherein the flange and the notch are configured such that when the flange is received in the notch, the panel is held in a fixed position.

5. The reel enclosure of claim 1, wherein the interior surface of the panel includes a raised support configured to receive the reel such that the reel is spaced from the interior surface of the panel.

6. The reel enclosure of claim 1, wherein at least one raise support structure on the interior surface of the panel is configured to cooperate with a hub of the reel to prevent rotation of the hub relative to the panel in both the first and second positions of the panel.

7. The reel enclosure of claim 6, wherein reel flanges of the reel are configured to be coupled with the hub such that the reel flanges are rotatable relative to the hub, the panel, and the base in order to permit payout of cable from the reel.

8. The reel enclosure of claim 7, wherein a back panel is mounted to the base and configured to accommodate optical fiber connections, and wherein the back panel includes a raised rib and the reel flanges include a plurality of teeth that are disposed about an inner periphery of the reel flanges and extend outward perpendicular to an outer face of one of the reel flanges.

9. The reel enclosure of claim 8, wherein, in the first closed position of the panel, the teeth of one of the reel flanges adjacent the back wall are configured to engage the raised rib to prevent rotation of the reel flanges relative to the panel and the base.

10. The reel enclosure of claim 8, wherein the back panel is the back wall of the base.

11. A reel enclosure comprising:
    a base; and
    a panel pivotally coupled with the base,
    wherein the panel is movable relative to the base between a first closed position and a second open position,
    wherein the panel is configured to hold a reel at an interior surface of the panel, the reel being configured to have cable wound thereon,
    wherein, in the first closed position, the base is configured to prevent the reel from rotating relative to the panel and the base, and the panel is configured to block access to the reel,
    wherein, in the second open position, the panel is configured to hold the reel outside of an interior of the base and permit the reel to rotate relative to the panel and the base,
    wherein a back panel is mounted to the base and configured to accommodate optical fiber connections,
    wherein the interior surface of the panel includes a raised support configured to receive the reel such that the reel is spaced from the interior surface of the panel,
    wherein at least one raise support structure on the interior surface of the panel is configured to cooperate with a hub of the reel to prevent rotation of the hub relative to the panel in both the first and second positions of the panel,
    wherein reel flanges of the reel are configured to be coupled with the hub such that the reel flanges are rotatable relative to the hub, the panel, and the base in order to permit payout of cable from the reel,
    wherein the back panel includes a raised rib and the reel flanges include a plurality of teeth that are disposed about an inner periphery of the reel flanges and extend outward perpendicular to an outer face of one of the reel flanges, and wherein, in the first closed position of the panel, the teeth of one of the reel flanges adjacent the back panel are configured to engage the raised rib to prevent rotation of the reel flanges relative to the panel and the base.

12. The reel enclosure of claim 11, wherein the panel is coupled to the base by a hinge connection, the hinge connection including a hinge receiver on a side wall of the base and a hinge member on the panel, the hinge receiver being configured to receive the hinge member.

13. The reel enclosure of claim 12, wherein the hinge receiver has an upper end with an opening configured to receive a pin of the hinge member, wherein the upper end of the hinge receiver includes a notched portion facing a direction opposite to a back wall of the base and toward an open side of the base, wherein the hinge member includes a flange extending from a front surface of the panel, the pin extends from the flange in a direction parallel to the panel, and the flange extends from the front surface of the mounting panel at a predetermined angle, wherein in the first closed position, a bottom surface of the flange rests on the upper end of the hinge receiver, and wherein in the second position, the panel is pivoted to a position where the bottom surface of the flange is aligned with the notch in the upper end of the hinge receiver, and the notch is configured to accommodate the flange such that the flange moves downward relative to the hinge receiver and into the notch.

14. The reel enclosure of claim 13, wherein the flange and the notch are configured such that when the flange is received in the notch, the panel is held in a fixed position.

15. The reel enclosure of claim 14, wherein the back panel is a back wall of the base.

* * * * *